US012577926B2

(12) United States Patent
Miller et al.

(10) Patent No.: US 12,577,926 B2
(45) Date of Patent: Mar. 17, 2026

(54) GAS TURBINE ENGINE

(71) Applicant: General Electric Company, Schenectady, NY (US)

(72) Inventors: Brandon W. Miller, Evendale, OH (US); Randy M. Vondrell, Evendale, OH (US); David M. Ostdiek, Evendale, OH (US); Craig W. Higgins, Evendale, OH (US); Alexander Simpson, Evendale, OH (US); Arthur W. Sibbach, Boxford, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/043,121

(22) Filed: Jan. 31, 2025

(65) Prior Publication Data

US 2025/0179975 A1      Jun. 5, 2025

Related U.S. Application Data

(63) Continuation-in-part of application No. 18/888,873, filed on Sep. 18, 2024, now Pat. No. 12,410,763, which is a continuation-in-part of application No. 18/675,270, filed on May 28, 2024, which is a continuation of application No. 17/879,384, filed on Aug. 2, 2022, now Pat. No. 12,031,504.

(51) Int. Cl.
F02K 3/065 (2006.01)
F02C 3/06 (2006.01)

(52) U.S. Cl.
CPC ............... F02K 3/065 (2013.01); F02C 3/06 (2013.01)

(58) Field of Classification Search
CPC . F02K 3/02; F02K 3/025; F02K 3/065; F02C 3/06; F02C 3/107; F02C 7/36
See application file for complete search history.

(56) References Cited

U.S. PATENT DOCUMENTS

| | | | |
|---|---|---|---|
| 2,999,630 A | 9/1961 | Warren et al. |
| 3,505,819 A | 4/1970 | Wilde |
| 3,528,250 A | 9/1970 | Johnson |
| 3,534,556 A | 10/1970 | Wilde |
| 3,540,682 A | 11/1970 | Dibble et al. |

(Continued)

FOREIGN PATENT DOCUMENTS

| | | |
|---|---|---|
| CN | 1204005 A | 1/1999 |
| CN | 101657607 A | 2/2010 |

(Continued)

OTHER PUBLICATIONS

Crigler, Application of Theodorsen's Theory to Propeller Design, NACA (National Advisory Committee for Aeronautics) Report 924, 1948, pp. 83-99.

(Continued)

*Primary Examiner* — Steven M Sutherland
(74) *Attorney, Agent, or Firm* — Klarquist Sparkman, LLP

(57) ABSTRACT

A gas turbine engine includes a turbomachine defining an engine inlet to an inlet duct, a fan duct inlet to a fan duct, and a core inlet to a core duct; a primary fan driven by the turbomachine; a nacelle surrounding the primary fan; and a secondary fan located downstream of the primary fan within the inlet duct. The gas turbine engine is characterized by a (Continued)

| Engine | As (328) | c (210) chord length | rr radius ratio | S span | Nb | Nv/Nb | γ stagger angle | BEAL | ASR | FBD |
|---|---|---|---|---|---|---|---|---|---|---|
| #1 | 20.0 | 27 | 0.350 | 25.0 | 16 | 2.6 | 33 | 4.70 | 1.62 | 76.9 (#1) |
| #2 | 3.0 | 10 | 0.350 | 24.0 | 20 | 3.0 | 39 | 0.56 | 1.80 | 73.8 (#1) |
| #3 | 9.0 | 26 | 0.300 | 30.0 | 24 | 2.1 | 31 | 2.30 | 1.88 | 85.7 (#2) |
| #4 | 11.0 | 20 | 0.250 | 26.0 | 22 | 3.0 | 35 | 1.53 | 2.40 | 69.3 (#1) |
| #5 | 2.0 | 8 | 0.200 | 28.0 | 22 | 3.0 | 30 | 0.22 | 2.96 | 70.0 (#1) |
| #6 | 6.0 | 16 | 0.250 | 30.0 | 20 | 2.5 | 45 | 0.80 | 2.98 | 80.0 (#2) |
| #7 | 10.0 | 31 | 0.300 | 28.0 | 26 | 2.6 | 34 | 3.13 | 1.60 | 80.0 (#2) |
| #8 | 20.0 | 26 | 0.330 | 30.0 | 14 | 2.9 | 30 | 2.46 | 2.84 | 89.6 (#2) |
| #9 | 10.0 | 18 | 0.340 | 32.0 | 22 | 3.0 | 31 | 1.20 | 2.79 | 97.0 (#3) |
| #10 | 10.0 | 28 | 0.330 | 35.0 | 16 | 2.8 | 55 | 1.22 | 2.91 | 104.5 (#3) |
| #11 | 21.0 | 29 | 0.210 | 38.0 | 16 | 2.5 | 31 | 3.00 | 2.80 | 96.2 (#3) |
| #12 | 18.0 | 35 | 0.290 | 40.0 | 20 | 3.0 | 36 | 3.49 | 1.72 | 112.7 (#3) |
| #13 | 13.1 | 12.8 | 0.275 | 31.9 | 22 | 2.2 | 43.0 | 0.47 | 12.75 | 88.0 (#2) |
| #14 | 13.9 | 12.8 | 0.275 | 31.9 | 22 | 2.2 | 43.0 | 0.47 | 13.53 | 88.0 (#2) |
| #15 | 19.5 | 13.5 | 0.210 | 28.0 | 14 | 2.9 | 55.0 | 0.68 | 10.11 | 80.0 (#2) |
| #16 | 16.5 | 18.5 | 0.270 | 37.2 | 16 | 2.3 | 53.0 | 0.95 | 7.73 | 101.9 (#3) |
| #17 | 16.5 | 18.5 | 0.270 | 32.0 | 16 | 2.3 | 53.0 | 1.10 | 6.65 | 87.7 (#2) |
| #18 | 14.5 | 12.8 | 0.280 | 31.4 | 20 | 3.0 | 43.0 | 0.53 | 9.12 | 87.2 (#2) |
| #19 | 10.3 | 12.8 | 0.275 | 28.0 | 22 | 2.2 | 43.0 | 0.54 | 8.80 | 77.2 (#1) |
| #20 | 5.5 | 14.0 | 0.275 | 29.0 | 22 | 2.2 | 43.0 | 0.62 | 4.07 | 80.0 (#2) |
| #21 | 3.8 | 11.0 | 0.375 | 33.0 | 22 | 2.2 | 43.0 | 0.34 | 5.18 | 91.0 (#2) |
| #22 | 14.0 | 12.0 | 0.275 | 32.0 | 22 | 2.2 | 43.0 | 0.41 | 15.55 | 88.3 (#2) | thrust to power airflow ratio, a core bypass ratio, a blade effective acoustic length, an acoustic spacing length, and an inlet-to-nacelle ratio.

20 Claims, 17 Drawing Sheets

(56)                References Cited

U.S. PATENT DOCUMENTS

| | | | |
|---|---|---|---|
| 3,542,152 | A | 11/1970 | Adamson et al. |
| 3,750,402 | A | 8/1973 | Vdoviak et al. |
| 4,010,608 | A | 3/1977 | Simmons |
| 4,043,121 | A | 8/1977 | Thomas et al. |
| 4,446,696 | A | 5/1984 | Sargisson et al. |
| 4,486,146 | A | 12/1984 | Campion |
| 4,569,199 | A | 2/1986 | Klees et al. |
| 4,607,657 | A | 8/1986 | Hirschkron |
| 4,784,575 | A | 11/1988 | Nelson et al. |
| 4,860,537 | A | 8/1989 | Taylor |
| 4,892,269 | A | 1/1990 | Greco et al. |
| 4,907,946 | A | 3/1990 | Ciokajlo et al. |
| 4,916,894 | A | 4/1990 | Adamson et al. |
| 4,976,102 | A | 12/1990 | Taylor |
| 5,054,998 | A | 10/1991 | Davenport |
| 5,190,441 | A | 3/1993 | Murphy et al. |
| 5,197,855 | A | 3/1993 | Magliozzi et al. |
| 5,259,187 | A | 11/1993 | Dunbar et al. |
| 5,261,227 | A | 11/1993 | Giffin, III |
| 5,299,914 | A | 4/1994 | Schilling |
| 5,345,760 | A | 9/1994 | Giffin, III |
| 5,457,346 | A | 10/1995 | Blumberg et al. |
| 5,950,308 | A | 9/1999 | Koff et al. |
| 6,195,983 | B1 | 3/2001 | Wadia et al. |
| 6,339,927 | B1 | 1/2002 | DiPietro, Jr. |
| 6,360,528 | B1 | 3/2002 | Brausch et al. |
| 6,547,518 | B1 | 4/2003 | Czachor et al. |
| 6,612,106 | B2 | 9/2003 | Balzer |
| 6,763,654 | B2 | 7/2004 | Orlando et al. |
| 6,792,758 | B2 | 9/2004 | Dowman |
| 7,065,957 | B2 | 6/2006 | Balzer |
| 7,101,154 | B2 | 9/2006 | Dambrine et al. |
| 7,118,331 | B2 | 10/2006 | Shahpar |
| 7,374,403 | B2 | 5/2008 | Decker et al. |
| 7,374,404 | B2 | 5/2008 | Schilling |
| 7,559,191 | B2 | 7/2009 | Parks |
| 7,658,063 | B1 | 2/2010 | Matheny |
| 7,762,766 | B2 | 7/2010 | Shteyman et al. |
| 8,256,202 | B1 | 9/2012 | Paulino |
| 8,276,392 | B2 | 10/2012 | van der Woude |
| 8,382,430 | B2 | 2/2013 | Parry et al. |
| 8,459,035 | B2 | 6/2013 | Smith et al. |
| 8,689,538 | B2 | 4/2014 | Sankrithi et al. |
| 8,762,766 | B2 | 6/2014 | Ferguson et al. |
| 8,876,465 | B2 | 11/2014 | Stretton |
| 8,910,465 | B2 | 12/2014 | Snyder |
| 8,943,796 | B2 | 2/2015 | McCaffrey |
| 8,967,967 | B2 | 3/2015 | Stretton et al. |
| 9,017,028 | B2 | 4/2015 | Fabre |
| 9,045,996 | B2 | 6/2015 | Anghel et al. |
| 9,057,328 | B2 | 6/2015 | Kupratis |
| 9,096,312 | B2 | 8/2015 | Moxon |
| 9,097,134 | B2 | 8/2015 | Ferch et al. |
| 9,249,530 | B2 | 2/2016 | Yoon et al. |
| 9,534,538 | B1 | 1/2017 | Cerny |
| 9,540,938 | B2 | 1/2017 | Topol et al. |
| 9,677,501 | B2 | 6/2017 | Pierluissi et al. |
| 9,759,160 | B2 | 9/2017 | Sankrithi et al. |
| 9,845,768 | B2 | 12/2017 | Pesyna et al. |
| 9,926,081 | B2 | 3/2018 | Vlastuin |
| 9,982,555 | B2 | 5/2018 | Thet et al. |
| 9,995,314 | B2 | 6/2018 | Miller et al. |
| 10,077,660 | B2 | 9/2018 | Hoefer et al. |
| 10,090,676 | B2 | 10/2018 | Knowles et al. |
| 10,107,191 | B2 | 10/2018 | Gilson et al. |
| 10,126,062 | B2 | 11/2018 | Cerny et al. |
| 10,184,400 | B2 | 1/2019 | Cerny et al. |
| 10,202,865 | B2 | 2/2019 | Breeze-Stringfellow et al. |
| 10,247,018 | B2 | 4/2019 | Topol et al. |
| 10,253,648 | B2 | 4/2019 | Bentley et al. |
| 10,260,419 | B2 | 4/2019 | Cerny et al. |
| 10,263,550 | B2 | 4/2019 | Thet et al. |
| 10,344,674 | B2 | 7/2019 | Cerny et al. |
| 10,364,750 | B2 | 7/2019 | Rambo |
| 10,443,436 | B2 | 10/2019 | Miller et al. |
| 10,458,247 | B2 | 10/2019 | Charbonnier et al. |
| 10,458,426 | B2 | 10/2019 | Wilkin, II et al. |
| 10,487,739 | B2 | 11/2019 | Miller et al. |
| 10,584,632 | B1 | 3/2020 | Kannangara et al. |
| 10,644,630 | B2 | 5/2020 | Smith et al. |
| 10,677,264 | B2 | 6/2020 | Moniz et al. |
| 10,711,797 | B2 | 7/2020 | Kroger et al. |
| 10,787,996 | B2 | 9/2020 | Kupratis et al. |
| 10,815,886 | B2 | 10/2020 | Kroger et al. |
| 10,907,495 | B2 | 2/2021 | Breeze-Stringfellow et al. |
| 12,012,898 | B2 | 6/2024 | Miller et al. |
| 2004/0197187 | A1 | 10/2004 | Usab et al. |
| 2004/0234372 | A1 | 11/2004 | Shahpar |
| 2005/0109012 | A1 | 5/2005 | Johnson |
| 2005/0241292 | A1 | 11/2005 | Taylor et al. |
| 2007/0186535 | A1 | 8/2007 | Powell et al. |
| 2007/0251212 | A1 | 11/2007 | Tester |
| 2009/0078819 | A1 | 3/2009 | Guering et al. |
| 2010/0014977 | A1 | 1/2010 | Shattuck |
| 2010/0111674 | A1 | 5/2010 | Sparks |
| 2010/0251726 | A1 | 10/2010 | Jones et al. |
| 2010/0326050 | A1 | 12/2010 | Schilling et al. |
| 2010/0329856 | A1 | 12/2010 | Hofer et al. |
| 2011/0150659 | A1 | 6/2011 | Micheli et al. |
| 2011/0192166 | A1 | 8/2011 | Mulcaire |
| 2012/0177493 | A1 | 7/2012 | Fabre |
| 2013/0098050 | A1 | 4/2013 | Kupratis |
| 2013/0104521 | A1 | 5/2013 | Kupratis |
| 2013/0104522 | A1 | 5/2013 | Kupratis |
| 2013/0104560 | A1 | 5/2013 | Kupratis |
| 2014/0133982 | A1 | 5/2014 | Dejeu et al. |
| 2014/0263737 | A1 | 9/2014 | Pierluissi et al. |
| 2014/0345253 | A1 | 11/2014 | Dawson et al. |
| 2014/0345254 | A1 | 11/2014 | Dawson et al. |
| 2015/0003993 | A1 | 1/2015 | Kim et al. |
| 2015/0044028 | A1 | 2/2015 | Lord et al. |
| 2015/0098813 | A1 | 4/2015 | Jarrett, Jr |
| 2015/0121893 | A1 | 5/2015 | Kupratis |
| 2015/0284070 | A1 | 10/2015 | Breeze-Stringfellow et al. |
| 2015/0291276 | A1 | 10/2015 | Zatorski et al. |
| 2016/0010487 | A1 | 1/2016 | Breeze-Stringfellow et al. |
| 2016/0053692 | A1 | 2/2016 | Izquierdo |
| 2016/0090863 | A1 | 3/2016 | Diaz et al. |
| 2016/0160647 | A1 | 6/2016 | Hofer et al. |
| 2016/0230658 | A1 | 8/2016 | Hanlon et al. |
| 2016/0298550 | A1 | 10/2016 | Kupratis et al. |
| 2016/0333734 | A1 | 11/2016 | Bowden et al. |
| 2016/0347463 | A1 | 12/2016 | Negulescu |
| 2017/0022820 | A1 | 1/2017 | Joseph et al. |
| 2017/0051678 | A1 | 2/2017 | Becker, Jr. |
| 2017/0051680 | A1 | 2/2017 | Becker, Jr. et al. |
| 2017/0102006 | A1 | 4/2017 | Miller et al. |
| 2017/0114721 | A1 | 4/2017 | Miller et al. |
| 2017/0167382 | A1 | 6/2017 | Miller et al. |
| 2017/0184027 | A1 | 6/2017 | Moniz et al. |
| 2017/0184053 | A1 | 6/2017 | Harvey et al. |
| 2017/0198719 | A1 | 7/2017 | Cerny et al. |
| 2018/0065727 | A1 | 3/2018 | Gruber et al. |
| 2018/0118364 | A1 | 5/2018 | Golshany et al. |
| 2018/0215475 | A1 | 8/2018 | Hurt et al. |
| 2018/0283795 | A1 | 10/2018 | Cerny et al. |
| 2019/0136710 | A1 | 5/2019 | Breeze-Stringfellow et al. |
| 2019/0153952 | A1 | 5/2019 | Niergarth et al. |
| 2019/0153953 | A1 | 5/2019 | Niergarth et al. |
| 2019/0218971 | A1 | 7/2019 | Niergarth et al. |
| 2019/0249599 | A1 | 8/2019 | Sen et al. |
| 2019/0257247 | A1 | 8/2019 | Pal et al. |
| 2019/0360401 | A1 | 11/2019 | Rambo et al. |
| 2020/0025109 | A1 | 1/2020 | Stieger et al. |
| 2020/0095939 | A1 | 3/2020 | Epstein |

(56) References Cited

U.S. PATENT DOCUMENTS

| | | |
|---|---|---|
| 2020/0116104 A1 | 4/2020 | Levisse et al. |
| 2020/0332718 A1 | 10/2020 | Rambo |
| 2020/0400069 A1 | 12/2020 | Aguilera et al. |
| 2021/0108573 A1 | 4/2021 | Sibbach et al. |
| 2021/0108595 A1 | 4/2021 | Khalid et al. |
| 2021/0108597 A1 | 4/2021 | Ostdiek et al. |
| 2022/0042461 A1 | 2/2022 | Molesani et al. |
| 2022/0042463 A1 | 2/2022 | Molesini et al. |
| 2022/0056811 A1 | 2/2022 | Molesini et al. |

FOREIGN PATENT DOCUMENTS

| | | |
|---|---|---|
| DE | 1081277 B | 5/1960 |
| EP | 0385913 A1 | 9/1990 |
| EP | 0887259 A2 | 12/1998 |
| EP | 1493900 A2 | 1/2005 |
| EP | 1988274 A2 | 11/2008 |
| EP | 2540989 A2 | 1/2013 |
| EP | 2562082 A2 | 2/2013 |
| EP | 3093443 A1 | 11/2016 |
| FR | 3074476 A1 | 6/2019 |
| FR | 3082230 A1 | 12/2019 |
| GB | 2100799 A | 1/1983 |
| GB | 2196390 A | 4/1988 |
| GB | 2461811 A | 1/2010 |
| JP | H0370698 A | 3/1991 |
| JP | 2006123880 A | 5/2006 |
| JP | 2009508748 A | 3/2009 |
| JP | 2011527263 A | 10/2011 |
| KR | 101179277 B1 | 9/2012 |
| WO | WO2004/033295 A1 | 4/2004 |
| WO | WO2005/111413 A1 | 11/2005 |
| WO | WO2011/020458 A2 | 2/2011 |
| WO | WO2011/094477 A2 | 8/2011 |
| WO | WO2011/107320 A1 | 9/2011 |
| WO | WO2014/143248 A1 | 9/2014 |

OTHER PUBLICATIONS

Gliebe et al., "Ultra-High Bypass Engine Aeroacoustic Study," NASA/CR-2003-212525, Oct. 2003, total of 109 pages (uploaded in 3 separate .pdf files)—Part 1 (40 pages).

Gliebe et al., "Ultra-High Bypass Engine Aeroacoustic Study," NASA/CR-2003-212525, Oct. 2003, total of 109 pages (uploaded in 3 separate .pdf files)—Part 2 (40 pages).

Gliebe et al., "Ultra-High Bypass Engine Aeroacoustic Study," NASA/CR-2003-212525, Oct. 2003, total of 109 pages (uploaded in 3 separate .pdf files)—Part 3 (29 pages).

Kumar et al., CFD Analysis of Low Pressure Turbine Blade Using Vortex Generator Jets, Proceedings of 7th International Conference on Intelligent Systemss and Control (ISCO 2013) IEEE Explore, Coimbatore, Tamil Nadu, India, Jan. 4-5, 2013, pp. 541-544. (https://ieeexplore.ieee.org/document/6481213).

Smith Jr, Unducted Fan Aerodynamic Design, Journal of Turbomachinery, vol. 109, Jul. 1987, pp. 313-324.

Theodorsen, Theory of Propellers, Wartime Report, NACA (National Advisory Committee for Aeronautics), Aug. 1944, pp. 1-53.

Yamamoto et al., Numerical Calculation of Propfan/Swirl Recovery Vane Flow Field, AIAA-92-3771, AIAA/SAE/ASME/ASEE 28th Joint Propulsion Conference And Exhibit, Jul. 6-8, 1992, Nashville TN, pp. 1-9.

| R1/R3 | TPAR | CBR | RqkPrim.-FAN | RqkSec.-FAN |
|---|---|---|---|---|
| 1.489 | 4.7 | 1.41 | 0.25 | 0.60 |
| 1.581 | 4.9 | 1.01 | 0.25 | 0.60 |
| 1.663 | 5.1 | 0.65 | 0.25 | 0.60 |
| 1.758 | 5.2 | 0.35 | 0.25 | 0.60 |
| 1.420 | 7.6 | 2.31 | 0.25 | 0.60 |
| 1.508 | 7.8 | 1.63 | 0.25 | 0.60 |
| 1.587 | 8.0 | 1.04 | 0.25 | 0.60 |
| 1.677 | 8.1 | 0.56 | 0.25 | 0.60 |
| 1.930 | 8.2 | 0.11 | 0.25 | 0.60 |
| 1.330 | 12.2 | 3.82 | 0.25 | 0.60 |
| 1.412 | 12.4 | 2.66 | 0.25 | 0.60 |
| 1.486 | 12.6 | 1.68 | 0.25 | 0.60 |
| 1.581 | 12.7 | 0.99 | 0.30 | 0.60 |
| 1.610 | 12.7 | 0.99 | 0.35 | 0.60 |
| 1.610 | 12.7 | 0.99 | 0.35 | 0.60 |
| 1.812 | 12.7 | 0.99 | 0.25 | 0.55 |
| 1.839 | 12.7 | 0.99 | 0.30 | 0.55 |
| 1.873 | 12.7 | 0.99 | 0.35 | 0.55 |
| 1.873 | 12.7 | 0.99 | 0.35 | 0.55 |
| 1.223 | 12.7 | 0.99 | 0.25 | 0.65 |
| 1.242 | 12.7 | 0.99 | 0.30 | 0.65 |
| 1.264 | 12.7 | 0.99 | 0.35 | 0.65 |
| 1.264 | 12.7 | 0.99 | 0.35 | 0.65 |
| 1.570 | 12.7 | 0.91 | 0.25 | 0.60 |
| 1.628 | 12.7 | 0.71 | 0.30 | 0.60 |
| 1.658 | 12.7 | 0.71 | 0.35 | 0.60 |
| 1.658 | 12.7 | 0.71 | 0.35 | 0.60 |
| 1.876 | 12.7 | 0.71 | 0.25 | 0.55 |
| 1.904 | 12.7 | 0.71 | 0.30 | 0.55 |
| 1.939 | 12.7 | 0.71 | 0.35 | 0.55 |
| 1.939 | 12.7 | 0.71 | 0.35 | 0.55 |
| 1.242 | 12.7 | 0.71 | 0.25 | 0.65 |
| 1.260 | 12.7 | 0.71 | 0.30 | 0.65 |
| 1.283 | 12.7 | 0.71 | 0.35 | 0.65 |
| 1.283 | 12.7 | 0.71 | 0.35 | 0.65 |
| 1.702 | 12.8 | 0.42 | 0.30 | 0.60 |
| 1.733 | 12.8 | 0.42 | 0.35 | 0.60 |
| 1.733 | 12.8 | 0.42 | 0.35 | 0.60 |
| 1.973 | 12.8 | 0.42 | 0.25 | 0.55 |
| 2.003 | 12.8 | 0.42 | 0.30 | 0.55 |
| 2.039 | 12.8 | 0.42 | 0.35 | 0.55 |
| 2.039 | 12.8 | 0.42 | 0.35 | 0.55 |
| 1.278 | 12.8 | 0.42 | 0.25 | 0.65 |
| 1.298 | 12.8 | 0.42 | 0.30 | 0.65 |

FIG. 4A

| R1/R3 | TPAR | CBR | RqRPrim. FAN | RqRSec. FAN |
|---|---|---|---|---|
| 1.321 | 12.8 | 0.42 | 0.35 | 0.65 |
| 1.321 | 12.8 | 0.42 | 0.35 | 0.65 |
| 1.812 | 12.8 | 0.17 | 0.25 | 0.60 |
| 1.839 | 12.8 | 0.17 | 0.30 | 0.60 |
| 1.873 | 12.8 | 0.17 | 0.35 | 0.60 |
| 1.873 | 12.8 | 0.17 | 0.35 | 0.60 |
| 2.144 | 12.8 | 0.17 | 0.25 | 0.55 |
| 2.176 | 12.8 | 0.17 | 0.30 | 0.55 |
| 2.216 | 12.8 | 0.17 | 0.35 | 0.55 |
| 2.216 | 12.8 | 0.17 | 0.35 | 0.55 |
| 1.362 | 12.8 | 0.17 | 0.25 | 0.65 |
| 1.383 | 12.8 | 0.17 | 0.30 | 0.65 |
| 1.408 | 12.8 | 0.17 | 0.35 | 0.65 |
| 1.408 | 12.8 | 0.17 | 0.35 | 0.65 |
| 2.492 | 13.2 | 2.84 | 0.25 | 0.60 |
| 2.295 | 13.3 | 2.99 | 0.25 | 0.60 |
| 2.010 | 13.5 | 3.26 | 0.25 | 0.60 |
| 1.788 | 13.7 | 3.55 | 0.25 | 0.60 |
| 2.671 | 13.8 | 2.11 | 0.30 | 0.60 |
| 2.720 | 13.8 | 2.11 | 0.35 | 0.60 |
| 2.720 | 13.8 | 2.11 | 0.35 | 0.60 |
| 2.969 | 13.8 | 2.11 | 0.25 | 0.55 |
| 3.013 | 13.8 | 2.11 | 0.30 | 0.55 |
| 3.068 | 13.8 | 2.11 | 0.35 | 0.55 |
| 3.068 | 13.8 | 2.11 | 0.35 | 0.55 |
| 2.209 | 13.8 | 2.11 | 0.25 | 0.65 |
| 2.242 | 13.8 | 2.11 | 0.30 | 0.65 |
| 2.283 | 13.8 | 2.11 | 0.35 | 0.65 |
| 2.283 | 13.8 | 2.11 | 0.35 | 0.65 |
| 2.647 | 13.9 | 2.03 | 0.25 | 0.60 |
| 2.780 | 14.2 | 1.54 | 0.30 | 0.60 |
| 2.831 | 14.2 | 1.54 | 0.35 | 0.60 |
| 2.831 | 14.2 | 1.54 | 0.35 | 0.60 |
| 3.129 | 14.2 | 1.54 | 0.25 | 0.55 |
| 3.176 | 14.2 | 1.54 | 0.30 | 0.55 |
| 3.234 | 14.2 | 1.54 | 0.35 | 0.55 |
| 3.234 | 14.2 | 1.54 | 0.35 | 0.55 |
| 2.239 | 14.2 | 1.54 | 0.25 | 0.65 |
| 2.273 | 14.2 | 1.54 | 0.30 | 0.65 |
| 2.314 | 14.2 | 1.54 | 0.35 | 0.65 |
| 2.314 | 14.2 | 1.54 | 0.35 | 0.65 |
| 2.783 | 14.4 | 1.32 | 0.25 | 0.60 |
| 2.920 | 14.6 | 0.93 | 0.30 | 0.60 |
| 2.973 | 14.6 | 0.93 | 0.35 | 0.60 |

FIG. 4B

| R1/R3 | TPAR | CBR | RqkPrim.-FAN | RqkSec.-FAN |
|---|---|---|---|---|
| 2.973 | 14.6 | 0.93 | 0.35 | 0.60 |
| 3.334 | 14.6 | 0.93 | 0.25 | 0.55 |
| 3.384 | 14.6 | 0.93 | 0.30 | 0.55 |
| 3.446 | 14.6 | 0.93 | 0.35 | 0.55 |
| 3.446 | 14.6 | 0.93 | 0.35 | 0.55 |
| 2.277 | 14.6 | 0.93 | 0.25 | 0.65 |
| 2.311 | 14.6 | 0.93 | 0.30 | 0.65 |
| 2.354 | 14.6 | 0.93 | 0.35 | 0.65 |
| 2.354 | 14.6 | 0.93 | 0.35 | 0.65 |
| 2.942 | 14.8 | 0.72 | 0.25 | 0.60 |
| 3.376 | 15.1 | 0.14 | 0.25 | 0.60 |
| 3.427 | 15.1 | 0.14 | 0.30 | 0.60 |
| 3.490 | 15.1 | 0.14 | 0.35 | 0.60 |
| 3.490 | 15.1 | 0.14 | 0.35 | 0.60 |
| 3.994 | 15.1 | 0.14 | 0.25 | 0.55 |
| 4.054 | 15.1 | 0.14 | 0.30 | 0.55 |
| 4.129 | 15.1 | 0.14 | 0.35 | 0.55 |
| 4.129 | 15.1 | 0.14 | 0.35 | 0.55 |
| 2.540 | 15.1 | 0.14 | 0.25 | 0.65 |
| 2.625 | 15.1 | 0.14 | 0.35 | 0.65 |
| 1.271 | 15.5 | 4.98 | 0.25 | 0.60 |
| 1.348 | 15.7 | 3.46 | 0.25 | 0.60 |
| 1.419 | 15.8 | 2.18 | 0.25 | 0.60 |
| 1.499 | 15.9 | 1.17 | 0.25 | 0.60 |
| 1.735 | 16.0 | 0.21 | 0.25 | 0.60 |
| 2.703 | 16.6 | 3.32 | 0.25 | 0.60 |
| 2.476 | 16.7 | 3.51 | 0.25 | 0.60 |
| 2.146 | 16.9 | 3.86 | 0.25 | 0.60 |
| 2.833 | 17.0 | 2.84 | 0.30 | 0.60 |
| 2.885 | 17.0 | 2.84 | 0.35 | 0.60 |
| 2.885 | 17.0 | 2.84 | 0.35 | 0.60 |
| 3.126 | 17.0 | 2.84 | 0.25 | 0.55 |
| 3.173 | 17.0 | 2.84 | 0.30 | 0.55 |
| 3.232 | 17.0 | 2.84 | 0.35 | 0.55 |
| 3.232 | 17.0 | 2.84 | 0.35 | 0.55 |
| 2.373 | 17.0 | 2.84 | 0.25 | 0.65 |
| 2.408 | 17.0 | 2.84 | 0.30 | 0.65 |
| 2.453 | 17.0 | 2.84 | 0.35 | 0.65 |
| 2.453 | 17.0 | 2.84 | 0.35 | 0.65 |
| 1.888 | 17.2 | 4.23 | 0.25 | 0.60 |
| 2.869 | 17.3 | 2.38 | 0.25 | 0.60 |
| 3.318 | 17.6 | 2.08 | 0.25 | 0.55 |
| 3.368 | 17.6 | 2.08 | 0.30 | 0.55 |
| 3.430 | 17.6 | 2.08 | 0.35 | 0.55 |

FIG. 4C

| R1/R3 | TPAR | CBR | RqRPrim.-FAN | RqRSec.-FAN |
|---|---|---|---|---|
| 3.430 | 17.6 | 2.08 | 0.35 | 0.55 |
| 2.415 | 17.6 | 2.08 | 0.25 | 0.65 |
| 2.452 | 17.6 | 2.08 | 0.30 | 0.65 |
| 2.497 | 17.6 | 2.08 | 0.35 | 0.65 |
| 2.497 | 17.6 | 2.08 | 0.35 | 0.65 |
| 3.019 | 17.9 | 1.54 | 0.25 | 0.60 |
| 3.123 | 18.1 | 1.26 | 0.30 | 0.60 |
| 3.181 | 18.1 | 1.26 | 0.35 | 0.60 |
| 3.181 | 18.1 | 1.26 | 0.35 | 0.60 |
| 3.554 | 18.1 | 1.26 | 0.25 | 0.55 |
| 3.607 | 18.1 | 1.26 | 0.30 | 0.55 |
| 3.673 | 18.1 | 1.26 | 0.35 | 0.55 |
| 3.673 | 18.1 | 1.26 | 0.35 | 0.55 |
| 2.457 | 18.1 | 1.26 | 0.25 | 0.65 |
| 2.494 | 18.1 | 1.26 | 0.30 | 0.65 |
| 2.540 | 18.1 | 1.26 | 0.35 | 0.65 |
| 2.540 | 18.1 | 1.26 | 0.35 | 0.65 |
| 3.190 | 18.4 | 0.84 | 0.25 | 0.60 |
| 3.376 | 18.6 | 0.52 | 0.30 | 0.60 |
| 3.962 | 18.6 | 0.52 | 0.30 | 0.55 |
| 4.034 | 18.6 | 0.52 | 0.35 | 0.55 |
| 4.034 | 18.6 | 0.52 | 0.35 | 0.55 |
| 2.555 | 18.6 | 0.52 | 0.25 | 0.65 |
| 2.593 | 18.6 | 0.52 | 0.30 | 0.65 |
| 2.641 | 18.6 | 0.52 | 0.35 | 0.65 |
| 2.641 | 18.6 | 0.52 | 0.35 | 0.65 |
| 3.579 | 18.8 | 0.26 | 0.30 | 0.60 |
| 3.645 | 18.8 | 0.26 | 0.35 | 0.60 |
| 3.645 | 18.8 | 0.26 | 0.35 | 0.60 |
| 4.162 | 18.8 | 0.26 | 0.25 | 0.55 |
| 4.225 | 18.8 | 0.26 | 0.30 | 0.55 |
| 4.302 | 18.8 | 0.26 | 0.35 | 0.55 |
| 4.302 | 18.8 | 0.26 | 0.35 | 0.55 |
| 2.668 | 18.8 | 0.26 | 0.25 | 0.65 |
| 2.708 | 18.8 | 0.26 | 0.30 | 0.65 |
| 2.757 | 18.8 | 0.26 | 0.35 | 0.65 |
| 2.757 | 18.8 | 0.26 | 0.35 | 0.65 |
| 3.683 | 18.8 | 0.16 | 0.25 | 0.60 |
| 3.797 | 18.8 | 0.13 | 0.30 | 0.60 |
| 3.867 | 18.8 | 0.13 | 0.35 | 0.60 |
| 3.867 | 18.8 | 0.13 | 0.35 | 0.60 |
| 4.578 | 18.8 | 0.13 | 0.35 | 0.55 |
| 4.578 | 18.8 | 0.13 | 0.35 | 0.55 |
| 2.807 | 18.8 | 0.13 | 0.25 | 0.65 |

FIG. 4D

| R1/R3 | TPAR | CBR | RqRPrim.-FAN | RqRSec.-FAN |
|---|---|---|---|---|
| 2.849 | 18.8 | 0.13 | 0.30 | 0.65 |
| 2.902 | 18.8 | 0.13 | 0.35 | 0.65 |
| 2.902 | 18.8 | 0.13 | 0.35 | 0.65 |
| 3.018 | 21.8 | 3.94 | 0.25 | 0.60 |
| 2.746 | 21.9 | 4.17 | 0.25 | 0.60 |
| 2.349 | 22.1 | 4.63 | 0.25 | 0.60 |
| 2.039 | 22.4 | 5.12 | 0.25 | 0.60 |
| 3.205 | 22.6 | 2.80 | 0.25 | 0.60 |
| 3.372 | 23.3 | 1.80 | 0.25 | 0.60 |
| 3.563 | 23.9 | 0.99 | 0.25 | 0.60 |
| 4.108 | 24.4 | 0.19 | 0.25 | 0.60 |
| 3.773 | 26.1 | 4.35 | 0.25 | 0.60 |
| 2.965 | 26.2 | 4.63 | 0.25 | 0.60 |
| 2.515 | 26.4 | 5.16 | 0.25 | 0.60 |
| 2.162 | 26.7 | 5.75 | 0.25 | 0.60 |
| 3.473 | 27.0 | 3.10 | 0.25 | 0.60 |
| 3.656 | 27.8 | 1.99 | 0.25 | 0.60 |
| 3.867 | 28.4 | 1.07 | 0.25 | 0.60 |
| 4.428 | 28.9 | 0.22 | 0.25 | 0.60 |
| 2.674 | 30.5 | 5.59 | 0.25 | 0.60 |
| 2.281 | 30.8 | 6.27 | 0.25 | 0.60 |
| 3.732 | 31.2 | 3.32 | 0.25 | 0.60 |
| 3.927 | 32.0 | 2.13 | 0.25 | 0.60 |
| 4.150 | 32.7 | 1.16 | 0.25 | 0.60 |
| 4.788 | 33.3 | 0.72 | 0.25 | 0.60 |
| 3.799 | 35.1 | 5.03 | 0.25 | 0.60 |
| 3.420 | 35.2 | 5.35 | 0.25 | 0.60 |
| 2.862 | 35.4 | 6.02 | 0.25 | 0.60 |
| 3.959 | 35.5 | 4.41 | 0.30 | 0.60 |
| 4.032 | 35.5 | 4.41 | 0.35 | 0.60 |
| 4.032 | 35.5 | 4.41 | 0.35 | 0.60 |
| 4.362 | 35.5 | 4.41 | 0.25 | 0.55 |
| 4.427 | 35.5 | 4.41 | 0.30 | 0.55 |
| 4.508 | 35.5 | 4.41 | 0.35 | 0.55 |
| 4.508 | 35.5 | 4.41 | 0.35 | 0.55 |
| 3.327 | 35.5 | 4.41 | 0.25 | 0.65 |
| 3.377 | 35.5 | 4.41 | 0.30 | 0.65 |
| 3.439 | 35.5 | 4.41 | 0.35 | 0.65 |
| 3.439 | 35.5 | 4.41 | 0.35 | 0.65 |
| 2.472 | 35.7 | 6.79 | 0.25 | 0.60 |
| 4.035 | 36.2 | 3.55 | 0.25 | 0.60 |
| 4.682 | 36.5 | 3.02 | 0.25 | 0.55 |
| 4.752 | 36.5 | 3.02 | 0.30 | 0.55 |
| 4.839 | 36.5 | 3.02 | 0.35 | 0.55 |

FIG. 4E

| R1/R3 | TPAR | CBR | RqRPrim.-FAN | RqRSec.-FAN |
|---|---|---|---|---|
| 4.839 | 36.5 | 3.02 | 0.35 | 0.55 |
| 3.400 | 36.5 | 3.02 | 0.25 | 0.65 |
| 3.451 | 36.5 | 3.02 | 0.30 | 0.65 |
| 3.514 | 36.5 | 3.02 | 0.35 | 0.65 |
| 3.514 | 36.5 | 3.02 | 0.35 | 0.65 |
| 4.245 | 37.0 | 2.77 | 0.25 | 0.60 |
| 4.464 | 37.5 | 1.55 | 0.30 | 0.60 |
| 4.546 | 37.5 | 1.55 | 0.35 | 0.60 |
| 4.546 | 37.5 | 1.55 | 0.35 | 0.60 |
| 5.101 | 37.5 | 1.55 | 0.25 | 0.55 |
| 5.177 | 37.5 | 1.55 | 0.30 | 0.55 |
| 5.772 | 37.5 | 1.55 | 0.35 | 0.55 |
| 5.772 | 37.5 | 1.55 | 0.35 | 0.55 |
| 3.477 | 37.5 | 1.55 | 0.25 | 0.65 |
| 3.579 | 37.5 | 1.55 | 0.30 | 0.65 |
| 3.594 | 37.5 | 1.55 | 0.35 | 0.65 |
| 3.594 | 37.5 | 1.55 | 0.35 | 0.65 |
| 4.487 | 37.7 | 1.23 | 0.25 | 0.60 |
| 5.162 | 38.3 | 0.24 | 0.25 | 0.60 |
| 6.208 | 38.4 | 0.20 | 0.25 | 0.55 |
| 6.301 | 38.4 | 0.20 | 0.30 | 0.55 |
| 6.417 | 38.4 | 0.20 | 0.35 | 0.55 |
| 6.417 | 38.4 | 0.20 | 0.35 | 0.55 |
| 3.936 | 38.4 | 0.20 | 0.25 | 0.65 |
| 3.995 | 38.4 | 0.20 | 0.30 | 0.65 |
| 4.069 | 38.4 | 0.20 | 0.35 | 0.65 |
| 4.069 | 38.4 | 0.20 | 0.35 | 0.65 |
| 4.185 | 41.8 | 5.36 | 0.25 | 0.60 |
| 3.754 | 41.9 | 5.73 | 0.25 | 0.60 |
| 3.118 | 42.1 | 6.48 | 0.25 | 0.60 |
| 2.616 | 42.5 | 7.36 | 0.25 | 0.60 |
| 4.446 | 42.9 | 3.77 | 0.25 | 0.60 |
| 4.677 | 43.8 | 2.41 | 0.25 | 0.60 |
| 4.943 | 44.5 | 1.30 | 0.25 | 0.60 |
| 5.664 | 45.2 | 0.26 | 0.25 | 0.60 |
| 4.577 | 48.6 | 5.59 | 0.25 | 0.60 |
| 4.092 | 48.7 | 5.99 | 0.25 | 0.60 |
| 3.378 | 48.9 | 6.81 | 0.25 | 0.60 |
| 2.814 | 49.3 | 7.77 | 0.25 | 0.60 |
| 4.859 | 49.7 | 3.97 | 0.25 | 0.60 |
| 5.112 | 50.7 | 2.50 | 0.25 | 0.60 |
| 5.158 | 56.5 | 6.05 | 0.35 | 0.60 |
| 5.158 | 56.5 | 6.05 | 0.35 | 0.60 |
| 5.578 | 56.5 | 6.05 | 0.25 | 0.55 |

FIG. 4F

| R1/R3 | TPAR | CBR | RqRPrim.-FAN | RqRSec.-FAN |
|---|---|---|---|---|
| 5.611 | 56.5 | 6.05 | 0.30 | 0.55 |
| 5.713 | 56.5 | 6.05 | 0.35 | 0.55 |
| 5.713 | 56.5 | 6.05 | 0.35 | 0.55 |
| 4.331 | 56.5 | 6.05 | 0.25 | 0.65 |
| 4.396 | 56.5 | 6.05 | 0.30 | 0.65 |
| 4.477 | 56.5 | 6.05 | 0.35 | 0.65 |
| 4.477 | 56.5 | 6.05 | 0.35 | 0.65 |
| 5.048 | 56.7 | 5.75 | 0.25 | 0.60 |
| 4.502 | 56.8 | 6.17 | 0.25 | 0.60 |
| 3.696 | 57.1 | 7.05 | 0.25 | 0.60 |
| 3.057 | 57.5 | 8.10 | 0.25 | 0.60 |
| 5.359 | 57.9 | 4.02 | 0.25 | 0.60 |
| 5.524 | 58.2 | 3.56 | 0.30 | 0.60 |
| 5.626 | 58.2 | 3.56 | 0.35 | 0.60 |
| 5.676 | 58.2 | 3.56 | 0.35 | 0.60 |
| 6.179 | 58.2 | 3.56 | 0.25 | 0.55 |
| 6.272 | 58.2 | 3.56 | 0.30 | 0.55 |
| 6.387 | 58.2 | 3.56 | 0.35 | 0.55 |
| 6.387 | 58.2 | 3.56 | 0.35 | 0.55 |
| 4.659 | 58.2 | 3.56 | 0.35 | 0.65 |
| 4.659 | 58.2 | 3.56 | 0.35 | 0.65 |
| 5.638 | 58.8 | 2.56 | 0.25 | 0.60 |
| 5.907 | 59.3 | 1.81 | 0.30 | 0.60 |
| 6.015 | 59.3 | 1.81 | 0.35 | 0.60 |
| 6.015 | 59.3 | 1.81 | 0.35 | 0.60 |
| 6.743 | 59.3 | 1.81 | 0.25 | 0.55 |
| 6.844 | 59.3 | 1.81 | 0.30 | 0.55 |
| 6.970 | 59.3 | 1.81 | 0.35 | 0.55 |
| 6.970 | 59.3 | 1.81 | 0.35 | 0.55 |
| 4.611 | 59.3 | 1.81 | 0.25 | 0.65 |
| 4.680 | 59.3 | 1.81 | 0.30 | 0.65 |
| 4.766 | 59.3 | 1.81 | 0.35 | 0.65 |
| 4.766 | 59.3 | 1.81 | 0.35 | 0.65 |
| 5.959 | 59.6 | 1.38 | 0.25 | 0.60 |
| 6.766 | 60.2 | 0.37 | 0.30 | 0.60 |
| 6.890 | 60.2 | 0.37 | 0.35 | 0.60 |
| 6.890 | 60.2 | 0.37 | 0.35 | 0.60 |
| 7.874 | 60.2 | 0.37 | 0.25 | 0.55 |
| 7.993 | 60.2 | 0.37 | 0.30 | 0.55 |
| 8.139 | 60.2 | 0.37 | 0.35 | 0.55 |
| 8.139 | 60.2 | 0.37 | 0.35 | 0.55 |
| 5.201 | 60.2 | 0.37 | 0.35 | 0.65 |
| 6.863 | 60.2 | 0.26 | 0.25 | 0.60 |
| 5.856 | 70.3 | 5.79 | 0.25 | 0.60 |

FIG. 4G

| R1/R3 | TPAR | CBR | RqRPrim.-FAN | RqRSec.-FAN |
|-------|------|-----|--------------|-------------|
| 5.205 | 70.4 | 6.24 | 0.25 | 0.60 |
| 4.245 | 70.7 | 7.16 | 0.25 | 0.60 |
| 3.483 | 71.2 | 8.79 | 0.25 | 0.60 |
| 6.217 | 71.4 | 4.04 | 0.25 | 0.60 |
| 6.541 | 72.3 | 2.55 | 0.25 | 0.60 |
| 6.913 | 73.0 | 1.38 | 0.25 | 0.60 |
| 7.962 | 73.7 | 0.26 | 0.25 | 0.60 |

FIG. 4H

| Engine | As (320) | c (210) chord length | rr radius ratio | S span | Nb | Nv/Nb | γ stagger angle | BEAL | ASR | FBD |
|---|---|---|---|---|---|---|---|---|---|---|
| #1 | 20.0 | 27 | 0.350 | 25.0 | 16 | 2.6 | 33 | 4.70 | 1.62 | 76.9 (#1) |
| #2 | 3.0 | 10 | 0.350 | 24.0 | 20 | 3.0 | 30 | 0.56 | 1.80 | 73.8 (#1) |
| #3 | 9.0 | 26 | 0.300 | 30.0 | 24 | 2.1 | 31 | 2.30 | 1.88 | 85.7 (#2) |
| #4 | 11.0 | 20 | 0.250 | 26.0 | 22 | 3.0 | 35 | 1.53 | 2.40 | 69.3 (#1) |
| #5 | 2.0 | 8 | 0.200 | 28.0 | 22 | 3.0 | 30 | 0.22 | 2.96 | 70.0 (#1) |
| #6 | 6.0 | 16 | 0.250 | 30.0 | 20 | 2.5 | 45 | 0.80 | 2.98 | 80.0 (#2) |
| #7 | 10.0 | 31 | 0.300 | 28.0 | 26 | 2.0 | 34 | 3.13 | 1.60 | 80.0(#2) |
| #8 | 20.0 | 20 | 0.330 | 30.0 | 14 | 2.9 | 30 | 2.46 | 2.84 | 89.6 (#2) |
| #9 | 10.0 | 18 | 0.340 | 32.0 | 22 | 3.0 | 31 | 1.20 | 2.79 | 97.0 (#3) |
| #10 | 10.0 | 20 | 0.330 | 35.0 | 16 | 2.8 | 55 | 1.22 | 2.91 | 104.5 (#3) |
| #11 | 21.0 | 29 | 0.210 | 38.0 | 16 | 2.5 | 31 | 3.00 | 2.80 | 96.2 (#3) |
| #12 | 18.0 | 35 | 0.290 | 40.0 | 20 | 3.0 | 36 | 3.49 | 1.72 | 112.7 (#3) |
| #13 | 13.1 | 12.8 | 0.275 | 31.9 | 22 | 2.2 | 43.0 | 0.47 | 12.75 | 88.0 (#2) |
| #14 | 13.9 | 12.8 | 0.275 | 31.9 | 22 | 2.2 | 43.0 | 0.47 | 13.53 | 88.0 (#2) |
| #15 | 19.5 | 13.5 | 0.210 | 28.0 | 14 | 2.9 | 55.0 | 0.68 | 10.11 | 80.0 (#2) |
| #16 | 16.5 | 18.5 | 0.270 | 37.2 | 16 | 2.3 | 53.0 | 0.95 | 7.73 | 101.9 (#3) |
| #17 | 16.5 | 18.5 | 0.270 | 32.0 | 16 | 2.3 | 53.0 | 1.10 | 6.65 | 87.7 (#2) |
| #18 | 14.5 | 12.8 | 0.280 | 31.4 | 20 | 3.0 | 43.0 | 0.53 | 9.12 | 87.2 (#2) |
| #19 | 10.3 | 12.8 | 0.275 | 28.0 | 22 | 2.2 | 43.0 | 0.54 | 8.80 | 77.2 (#1) |
| #20 | 5.5 | 14.0 | 0.275 | 29.0 | 22 | 2.2 | 43.0 | 0.62 | 4.07 | 80.0 (#2) |
| #21 | 3.8 | 11.0 | 0.275 | 33.0 | 22 | 2.2 | 43.0 | 0.34 | 5.18 | 91.0 (#2) |
| #22 | 14.0 | 12.0 | 0.275 | 32.0 | 22 | 2.2 | 43.0 | 0.41 | 15.55 | 88.3 (#2) |

FIG. 10

GAS TURBINE ENGINE

CROSS-REFERENCE TO RELATED U.S. PATENT APPLICATIONS

This application is a continuation-in-part application of U.S. application Ser. No. 18/888,873, filed Sep. 18, 2024, which is a continuation-in-part application of U.S. application Ser. No. 18/675,270, filed May 28, 2024, which is a continuation application of U.S. application Ser. No. 17/879,384, filed Aug. 2, 2022, now U.S. Pat. No. 12,031,504, each of which is incorporated by reference herein in its entirety.

FIELD

The present disclosure relates to gas turbine engines for aircraft.

BACKGROUND

A gas turbine engine typically includes a fan and a turbomachine. The turbomachine generally includes an inlet, one or more compressors, a combustor, and one or more turbines. The compressor(s) compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight. The turbomachine is mechanically coupled to the fan for driving the fan during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIGS. 4A through 4H are tables depicting numerical values showing the relationships between various parameters in accordance with various example embodiments of the present disclosure.

FIG. 10 shows exemplary acoustic spacing ratios for exemplary gas turbine engines.

DETAILED DESCRIPTION

Figure 1:
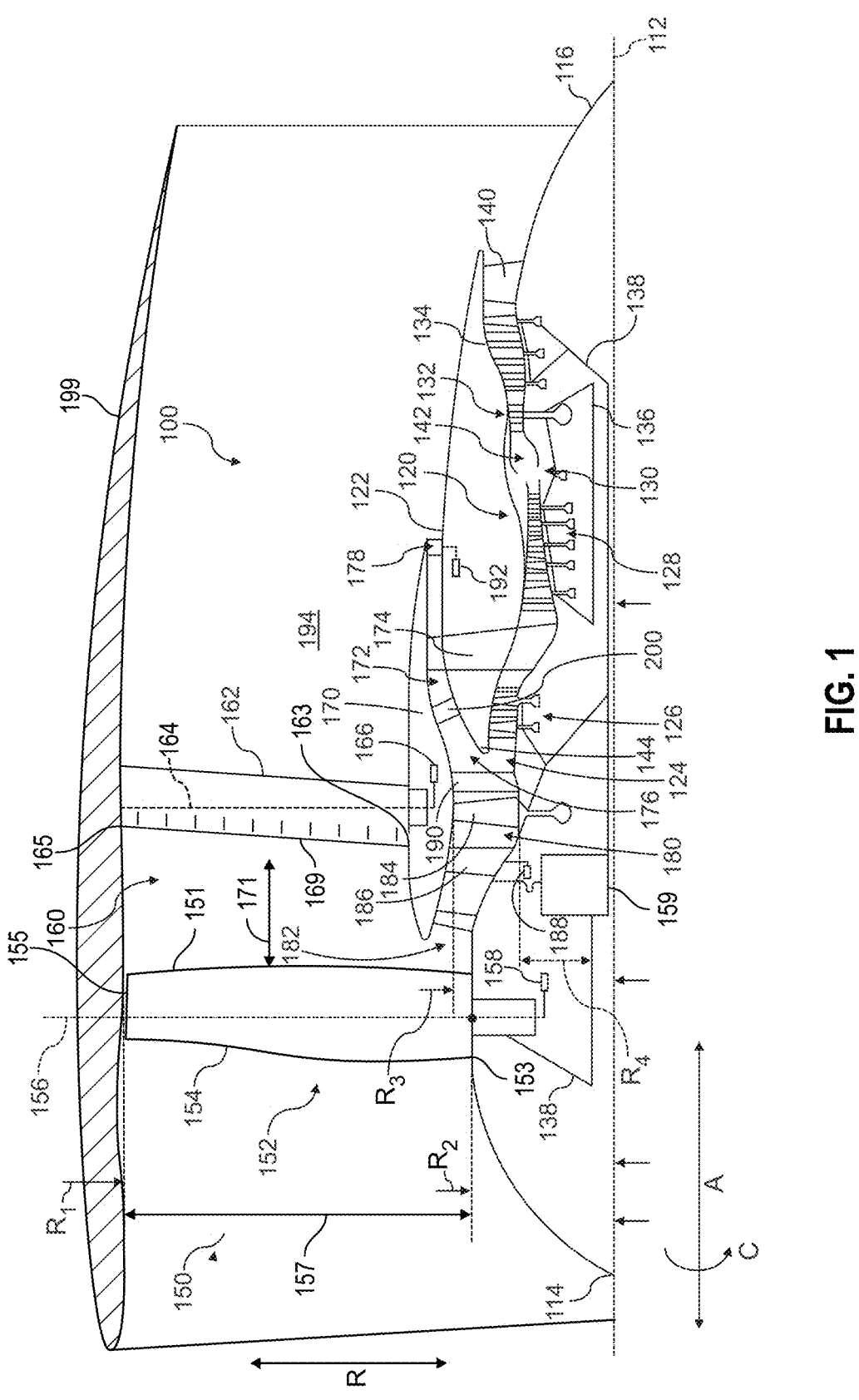
FIG. 1 is a schematic cross-sectional view of a three-stream engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods.

The terms "provide" or "achieve" are high-level abstractions of actual operations that are performed during the disclosed methods. The actual operations that correspond to these terms may vary depending on the particular implementation and are relatively discernable by one of ordinary skill in the art.

The term "exemplary" means "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The terms "first," "second," and "third" may be used interchangeably to distinguish one component from another and are not intended to signify location or importance of the individual components.

The singular forms "a," "an," and "the" include plural references unless the context clearly dictates otherwise. That is, if two of a particular element are present, one of these elements is also present and thus "an" element is present. The terms "a plurality of" and "plural" mean two or more of the specified element. As used herein, the term "and/or" used between the last two of a list of elements means any one or more of the listed elements. For example, the phrase "A, B, and/or C" means "A," "B," "C," "A and B," "A and C," "B and C" or "A, B and C."

The phrases "from X to Y" and "between X and Y" each refers to a range of values inclusive of the endpoints (i.e., refers to a range of values that includes both X and Y).

The term "coupled" generally means physically, chemically, electrically, magnetically, or otherwise coupled or linked and does not exclude the presence of intermediate elements between the coupled items absent specific contrary language.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "radial" refers to a dimension extending radially outwards from a central longitudinal axis.

The term "third stream" refers to a non-primary air stream capable of increasing fluid energy to produce a minority of total propulsion system thrust. A pressure ratio of the third stream may be higher than that of the primary propulsion stream (e.g., a bypass propulsion stream). The thrust may be produced through a dedicated nozzle or through mixing of an airflow through the third stream with a primary propulsion stream or a core air stream, e.g., into a common nozzle.

In some embodiments, an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In some embodiments, these operating temperatures may facilitate heat transfer to or from the airflow through the third stream and a separate fluid stream. Further, in some embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions.

Furthermore in some embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "bypass passage" refers generally to a passage with an airflow from a fan of the gas turbine engine that flows over an upstream-most inlet to a turbomachine of the gas turbine engine. In a ducted gas turbine engine, the bypass passage is the passage defined between an outer nacelle (surrounding the fan of the gas turbine engine) and one or more cowls inward of the outer nacelle (e.g., a fan cowl, a core cowl or both if both are present; see, e.g., FIGS. 6 through 7).

The term "disk loading" refers to an average pressure change across a plurality of rotor blades of a rotor assembly, such as the average pressure change across a plurality of fan blades of a fan.

The term "rated speed" refers to an operating condition of an engine whereby the engine is operating in the maximum, full load operating condition that is rated by the manufacturer. For example, in an engine certified by the Federal Aviation Administration ("FAA"), the rated speed refers to a rotation speed of the engine during the highest sustainable and continuous power operation in the certification documents, such as a rotational speed of the gas turbine engine when operating under a maximum continuous operation.

The term "standard day operating condition" refers to ambient conditions of sea level altitude, 59 degrees Fahrenheit, and 60 percent relative humidity.

The term "propulsive efficiency" refers to an efficiency with which the energy contained in an engine's fuel is converted into kinetic energy for the vehicle incorporating the engine, to accelerate it, or to replace losses due to aerodynamic drag or gravity.

The term "OGV" refers to an outlet guide vane of the gas turbine engine.

A three-stream gas turbine engine typically includes a turbomachine including a core duct, a fan duct fluidly connected to the core duct, and a secondary fan disposed in the fan duct; an outer nacelle surrounding the turbomachine; a bypass passage disposed between the turbomachine and the outer nacelle; outlet guide vanes (OGVs) extending between the turbomachine and the outer nacelle; and a primary fan forward of the OGVs. The primary fan provides a first airflow (which is also referred to herein as a "first stream") through the bypass passage and the secondary fan provides a second airflow (which is also referred to as a "second stream") through the core duct and a third airflow (which is also referred to as a "third stream") through the fan duct. The primary and secondary fans provide a desired amount of thrust, thereby maintaining a desired overall propulsive efficiency for the gas turbine engine. The outer nacelle surrounding the primary fan provides relatively efficient thrust for the gas turbine engine. The relatively efficient thrust results in a desirable, relatively high propulsive efficiency for the gas turbine engine.

In some embodiments, increasing a diameter of the primary fan can increase the amount of thrust produced by the gas turbine engine, thereby improving the propulsive efficiency of the gas turbine engine. However, it can be difficult to design the gas turbine engine to feature increased primary fan diameters because, first, the presence of the outer nacelle surrounding the primary fan may limit a maximum size (i.e., diameter) of the primary fan. Second, the outer nacelle surrounding the primary fan must be enlarged to accommodate the increased primary fan diameter, and the weight of the enlarged outer nacelle may be prohibitive with some larger diameter primary fans. Third, increasing the diameter of the primary fan can make the gas turbine engine unwieldy and more difficult to install on an aircraft. Finally, increasing the thrust of the gas turbine engine correspondingly increases the thermal demands on the gas turbine engine.

Additionally, gas turbine engines typically generate significant noise during operation, and it is desirable to reduce the amount of noise generated. The degree of noise generated is a function of, among other things, the relative positioning of components of the engine. Modifications to the gas turbine engine's architecture, such as the relative position of an OGV downstream of the primary fan and the airfoil characteristics of the OGV, can have a significant impact on the degree of noise generated. However, changes made to reduce noise can also negatively impact engine performance, e.g., thrust generation and/or propulsive efficiency, because changing the relative positions or airfoil characteristics of the OGVs can impose significant penalties on the gas turbine engine's performance. Thus, difficult trade-offs must be made between reducing the noise envelope to satisfy more stringent community noise requirements and maintaining a certain level of engine performance, e.g., thrust generation and/or propulsive efficiency. Conventional methods of reducing gas turbine engine noise, such as varying fan pressure ratio ("FPR"), can be insufficient to meet increasingly stringent community noise requirements.

During the course of evaluating and designing various gas turbine engine designs, the inventors of the present disclosure determined that a quieter three-stream gas turbine engine with a desirably high propulsive efficiency can be achieved by designing the gas turbine engine to include a specific range of acoustic spacing between the blades of the primary fan and the OGVs, a specific ratio of an airflow through the bypass passage and the third stream to an airflow through the core duct (referred to herein as a "thrust to power airflow ratio"), and a specific ratio of an airflow through the third steam to the airflow through the core duct (referred to herein as a "core bypass ratio"), in combination with specific ranges of certain other features of the gas turbine engine's architecture.

As part of the process of determining the three-stream gas turbine engine's acoustic spacing, the inventors further determined that a certain relationship between a ratio of the acoustic spacing and a blade effective acoustic length, which is determined based on particular features of the gas turbine engine's primary fan (e.g., chord length, span, stagger angle, radius ratio, number of blades), can provide desirable improvements in noise reductions for the three-stream gas turbine engine while maintaining—or even increasing—the propulsive efficiency of the three-stream gas turbine engine. Thus, the inventors discovered that a three-stream gas turbine engine featuring an acoustic spacing, a blade effective acoustic length, a thrust to power airflow ratio, and a core bypass ratio within certain ranges (e.g., the ranges disclosed herein) can exhibit a desirable balance between a low degree of noise generation and a high propulsive efficiency.

Referring now to FIG. 1, a schematic cross-sectional view of a gas turbine engine 100 is provided according to an example embodiment of the present disclosure. As shown, the engine 100 includes a rotor assembly surrounded by an outer nacelle. Thus, the rotor assembly may be referred to herein as a "ducted fan," and the gas turbine engine 100 may be referred to herein as a "ducted engine." The engine 100 of FIG. 1 includes a third stream extending from the compressor section to a rotor assembly flowpath over the turbomachine, as will be explained in more detail below.

The engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

As used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. As will be appreciated, the high pressure compressor 128, the combustor 130, and the high pressure turbine 132 may collectively be referred to as the "core" of the engine 100. The core is also referred to herein as a "core turbine engine" or "core engine." The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. As shown in FIG. 1, the fan 152 is a ducted fan surrounded by an outer nacelle 199. In such a manner, the engine 100 may be referred to as a ducted engine.

As shown, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. For the embodiment shown in FIG. 1, the fan 152 is coupled with the LP shaft 138 via a speed reduction gearbox 159, e.g., in an indirect-drive or geared-drive configuration.

Moreover, the array of fan blades 154 can be arranged in equal spacing around the longitudinal axis 112. Each fan blade 154 has a trailing edge 151, a root 153, and a tip 155. Each fan blade 154 defines a span 157 defined between the root 153 and the tip 155. Further, each fan blade 154 defines a fan blade tip radius $R_1$ along the radial direction R from the longitudinal axis 112 to a leading edge of the tip 155, and a hub radius (or inner radius) $R_2$ along the radial direction R from the longitudinal axis 112 to the leading edge of the root 153. Thus, the span 157 of the fan blade 154 extends from the root 153 at a 0% span position to the tip 155 at a 100% span position.

Further, the fan 152, or rather each fan blade 154 of the fan 152, defines a fan radius ratio, RqR, equal to $R_2$ divided by $R_1$. As the fan 152 is the primary fan of the engine 100, the fan radius ratio, RqR, of the fan 152 may be referred to as the primary fan radius ratio, $RqR_{Prim.-Fan}$.

Moreover, each fan blade 154 defines a central blade axis 156. In the illustrated embodiment, each fan blade 154 of the fan 152 is rotatable about its respective central blade axis 156, e.g., in unison with the other fan blades 154. One or more actuators 158 are provided to facilitate such rotation and therefore may be used to change a pitch of the fan blades 154 about their respective central blades' axes 156.

The fan blades 154 of the fan 152 can each define a blade solidity, chord length, and a stagger angle, which are further defined later herein in with respect to FIG. 8. These dimensions can be used to characterize the gas turbine engine 100 by a blade effective acoustic length (BEAL), which is further described later herein with respect to FIG. 9.

The fan section 150 further includes an outlet guide vane array 160 that includes outlet guide vanes 162 (only one of which is shown in FIG. 1) disposed around the longitudinal axis 112. The outlet guide vanes 162 are mounted to a fan cowl 170 and extend between the fan cowl 170 and the outer nacelle 199. In the illustrated embodiment, the outlet guide vanes 162 are not rotatable about the longitudinal axis 112. However, in some embodiments, the outlet guide vanes 162 can be rotatable about the longitudinal axis 112. Each outlet guide vane 162 includes a root 163, a tip 165, and a span 167 (FIG. 2) defined therebetween. The root 163 is at a 0% span position of the outlet guide vane 162 and the tip 165 is at a 100% span position of the outlet guide vane 162. The outlet guide vanes 162 are shrouded, by the outer nacelle 199 surrounding the tips of the outlet guide vanes 162 along the radial direction R.

In some embodiments, one or more of the outlet guide vanes 162 can be swept such that the tip 165 of the outlet guide vane 162 is angled towards the aft end of the gas turbine engine 100. In some embodiments, one or more of the outlet guide vanes 162 can include a serrated leading edge 169. The serrated leading edge 169 can include a waveform or a serration extending radially along the edge of each of the outlet guide vanes 162. The waves or serrations are configured to reduce the noise generated by the air in the bypass stream passing over the outlet guide vanes 162.

Each outlet guide vane 162 defines a central blade axis 164. In the illustrated embodiment, each outlet guide vane 162 of the outlet guide vane array 160 is rotatable about its respective central blade axis 164, e.g., in unison with one another. One or more actuators 166 are provided to facilitate such rotation and therefore may be used to change a pitch of the outlet guide vane 162 about its respective central blade axis 164. However, in some embodiments, each outlet guide vane 162 may be fixed or unable to be pitched about its central blade axis 164.

The fan blade 154 and its corresponding outlet guide vane 162 illustrated in FIG. 1 are separated by an acoustic spacing (As) 171. The acoustic spacing 171 is a length measured parallel to the longitudinal axis 112 that extends from a trailing edge of the fan blade 154 to the leading edge of the corresponding outlet guide vane 162. The acoustic spacing 171 is measured at a 75% span position of the fan blade 154. The acoustic spacing 171 is discussed in further detail later herein with respect to acoustic spacing 543 shown in FIG. 9.

As shown in FIG. 1, in addition to the ducted fan 152 (which is also referred to herein as a "first ducted fan"), a second ducted fan 184 is included aft of the first ducted fan 152, such that the engine 100 includes two ducted fans which both serve to generate thrust through the movement of air without passage through at least a portion of the turbomachine 120 (e.g., without passage through the HP compressor 128 and combustion section for the embodiment depicted). The second ducted fan 184 is rotatable about the same axis (e.g., the longitudinal axis 112) as the first ducted fan 152. The second ducted fan 184 is, for the embodiment depicted, driven by the low pressure turbine 134 (e.g., coupled to the LP shaft 138). In the embodiment depicted, as noted above, the first ducted fan 152 may be referred to as the primary fan, and the second ducted fan 184 may be referred to as a secondary fan. It will be appreciated that these terms "primary" and "secondary" are terms of convenience, and do not imply any particular importance, power, or the like.

The second ducted fan 184 includes a plurality of fan blades (not separately labeled in FIG. 1; see fan blades 185 labeled in FIG. 2) arranged in a single stage, such that the second ducted fan 184 may be referred to as a single stage fan. The fan blades of the second ducted fan 184 can be arranged in equal spacing around the longitudinal axis 112. Each blade of the second ducted fan 184 has a root and a tip and a span defined therebetween. Further, each fan blade of the second ducted fan 184 defines a fan blade tip radius $R_3$ along the radial direction R from the longitudinal axis 112 to the tip, and a hub radius (or inner radius) $R_4$ along the radial direction R from the longitudinal axis 112 to the base of the respective fan blades of the second ducted fan 184 (i.e., a location where the respective fan blades of the second ducted fan 184 meet an inner flowpath liner at a leading edge of the respective fan blades of the second ducted fan 184). As will be appreciated, a distance from the base of each fan blade of the second ducted fan 184 to a tip of the respective fan blade is referred to as a span of the respective fan blade. Further, the second ducted fan 184, or rather each fan blade of the second ducted fan 184, defines a fan radius ratio, RqR, equal to $R_4$ divided by $R_3$. As the second ducted fan 184 is the secondary fan of the engine 100, the fan radius ratio, RqR, of the second ducted fan 184 may be referred to as the secondary fan radius ratio, $RqR_{Sec.-Fan}$.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the outlet guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. The inlet duct 180 is wider than the core duct 142 along the radial direction R. The inlet duct 180 is also wider than the fan duct 172 along the radial direction R. The secondary fan 184 is positioned at least partially in the inlet duct 180.

Notably, the illustrated engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vane 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the second ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the illustrated embodiment, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the second ducted fan 184, the array of outlet guide vanes 190 located downstream of the second ducted fan 184, and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the engine 100 may be capable of generating more efficient third stream thrust, $Fn_{3S}$, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 200 may be positioned in thermal communication with the fan duct 172. For example, one or more heat exchangers 200 may be disposed within the fan duct 172 and utilized to cool one or more fluids from the core engine with the air passing through the fan duct 172, as a resource for removing heat from a fluid, e.g., compressor bleed air, oil, or fuel.

Although not depicted, the heat exchanger 200 may be an annular heat exchanger extending substantially 360 degrees in the fan duct 172 (e.g., at least 300 degrees, such as at least 330 degrees). In such a manner, the heat exchanger 200 may effectively utilize the air passing through the fan duct 172 to cool one or more systems of the engine 100 (e.g., lubrication oil systems, compressor bleed air, electrical components, etc.). The heat exchanger 200 uses the air passing through duct 172 as a heat sink and correspondingly increases the temperature of the air downstream of the heat exchanger 200 and exiting the fan exhaust nozzle 178.

Figure 2:
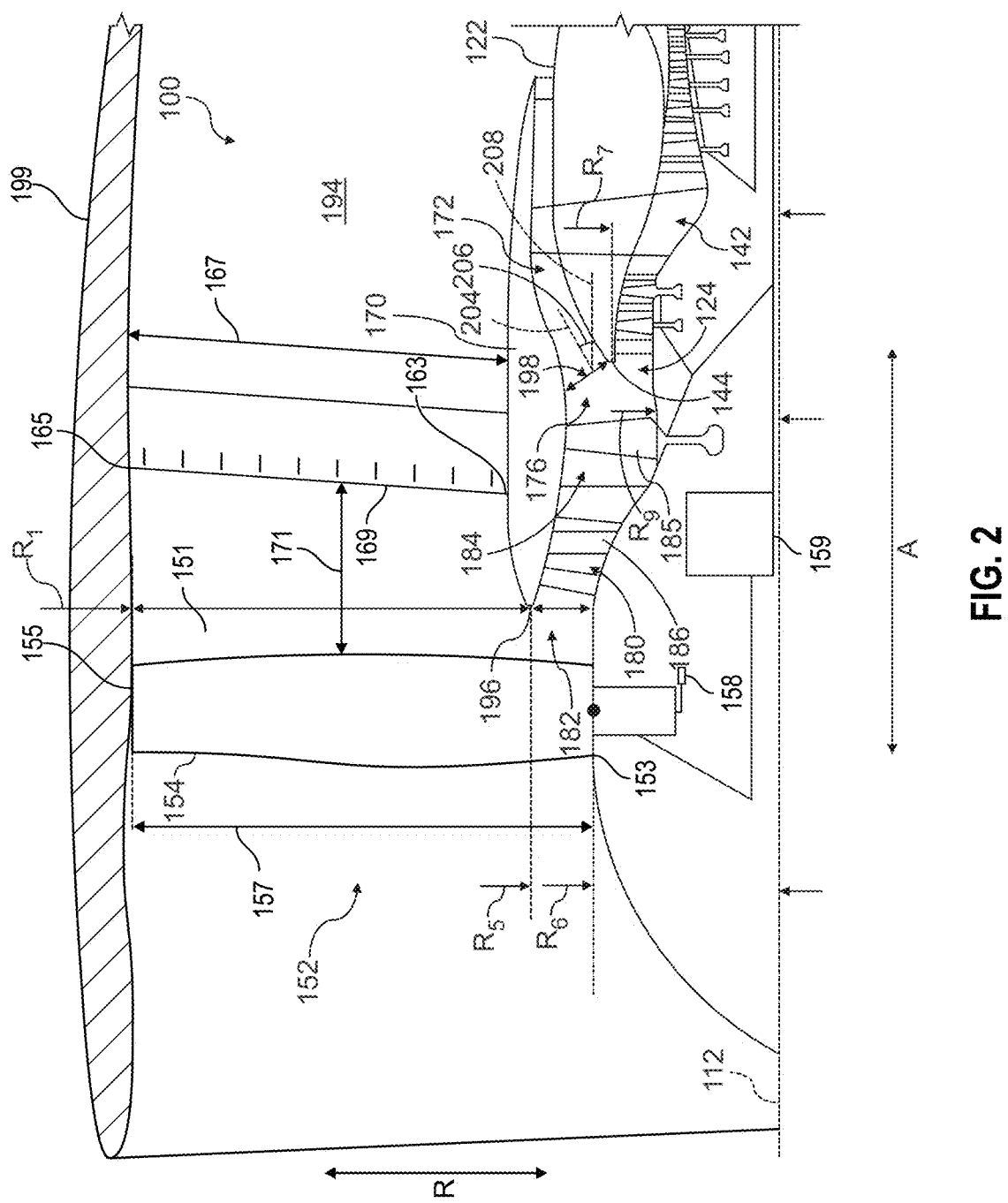
FIG. 2 is a close-up, schematic view of the exemplary three-stream engine of FIG. 1.

Referring now to FIG. 2, a close-up, simplified, schematic view of the gas turbine engine 100 of FIG. 1 is provided. The gas turbine engine 100, as noted above includes a primary fan 152 having fan blades 154 and a secondary fan 184 having fan blades 185. Airflow from the primary fan 152 is split between a bypass region 194 (as defined below) and the inlet duct 180 by an inlet splitter 196. Airflow from the secondary fan 184 is split between the fan duct 172 and the core duct 142 by the leading edge 144 (sometimes also referred to as a fan duct splitter).

The exemplary gas turbine engine 100 depicted in FIG. 2 further defines a primary fan outer fan area, $A_{P\_Out}$, a primary fan inner fan area, $A_{P\_In}$, a secondary fan outer fan area, $A_{S\_Out}$, and a secondary fan inner fan area, $A_{S\_In}$.

The primary fan outer fan area, $A_{P\_Out}$, refers to an area defined by an annulus representing a portion of the primary fan 152 located outward of the inlet splitter 196 of the fan cowl 170. In particular, the gas turbine engine 100 further defines a fan cowl splitter radius, $R_5$. The fan cowl splitter radius, $R_5$, is defined along the radial direction R from the longitudinal axis 112 to the inlet splitter 196. The primary fan outer fan area, $A_{P\_Out}$, refers to an area defined by the formula: $\pi R_1^2 - \pi R_5^2$.

The primary fan inner fan area, $A_{P\_In}$, refers to an area defined by an annulus representing a portion of the primary fan 152 located inward of the inlet splitter 196 of the fan cowl 170. In particular, the gas turbine engine 100 further defines an engine inlet inner radius, $R_6$. The engine inlet inner radius, $R_6$, is defined along the radial direction R from the longitudinal axis 112 to an inner casing defining the engine inlet 182 directly inward along the radial direction R from the inlet splitter 196. The primary fan inner fan area, $A_{P\_In}$, refers to an area defined by the formula: $\pi R_5^2 - \pi R_6^2$.

The secondary fan outer fan area, $A_{S\_Out}$, refers to an area representing a portion of an airflow from the secondary fan 184 that is provided to the fan duct 172. In particular, the leading edge 144 defines a leading edge radius, $R_7$, and the gas turbine engine 100 defines an effective fan duct inlet outer radius, $R_8$ (see FIG. 3). The leading edge radius, $R_7$, is defined along the radial direction R from the longitudinal axis 112 to the leading edge 144.

Figure 3:
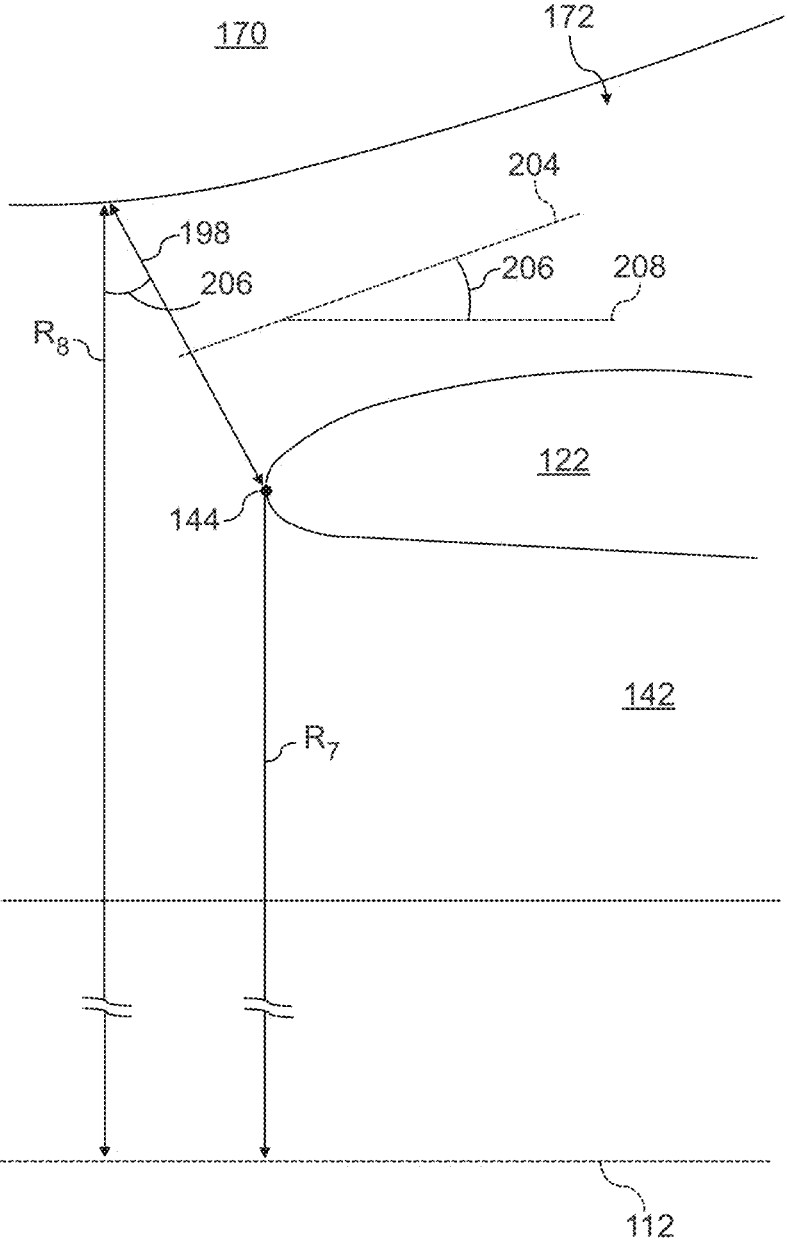
FIG. 3 is a close-up view of an area surrounding a leading edge of a core cowl of the exemplary three-stream engine of FIG. 2.

Referring briefly to FIG. 3, providing a close-up view of an area surrounding the leading edge 144, the fan duct 172 defines a cross-wise height 198 measured from the leading edge 144 to the fan cowl 170 in a direction perpendicular to a mean flow direction 204 of an airflow through a forward 10% of the fan duct 172. An angle 206 is defined by the mean flow direction 204 relative to a reference line 208 extending parallel to the longitudinal axis 112. The angle 206 is referred to as θ. In certain embodiments, the angle 206 may be between 5 degrees and 80 degrees, such as between 10 degrees and 60 degrees (an increased angle is a counterclockwise rotation in FIG. 3). The effective fan duct inlet outer radius, $R_8$, is defined along the radial direction R from the longitudinal axis 112 to where the cross-wise height 198 meets the fan cowl 170. The secondary fan outer fan area, $A_{S\_Out}$, refers to an area defined by the formula:

$$\frac{\pi \left(R_8^2 - R_7^2\right)}{\cos\left(\theta\right)}.$$

Referring back to FIG. 2, the secondary fan inner fan area, $A_{S\_In}$, refers to an area defined by an annulus representing a portion of the secondary fan 184 located inward of the leading edge 144 of the core cowl 122. In particular, the gas turbine engine 100 further defines a core inlet inner radius, $R_9$. The core inlet inner radius, $R_9$, is defined along the radial direction R from the longitudinal axis 112 to an inner casing defining the core inlet 124 directly inward along the radial direction R from the leading edge 144. The secondary fan inner fan area, $A_{S\_In}$, refers to an area defined by the formula: $\pi R_7^2 - \pi R_9^2$.

The primary fan outer fan area, $A_{P\_Out}$, the primary fan inner fan area, $A_{P\_In}$, the secondary fan outer fan area, $A_{S\_Out}$, and the secondary fan inner fan area, $A_{S\_In}$, may be used in defining various airflow ratios for the engine 100. In particular, it will be appreciated that the exemplary engine 100 of FIGS. 1 through 3 further defines a thrust to power airflow ratio and a core bypass ratio, which as discussed herein are used to define an engine in accordance with the present disclosure. The thrust to power airflow ratio is a ratio of an airflow through the bypass passage of the engine 100 and through the fan duct 172 to an airflow through the core duct 142. The bypass passage (not separately labeled) is located within the bypass region 194 and refers to a passage where airflow from the primary fan 152 passes over the inlet duct 180. Further, the core bypass ratio is a ratio of an airflow through the fan duct 172 to the airflow through the core duct 142. These ratios are calculated while the engine 100 is operating at a rated speed during standard day operating conditions, and the amounts of airflow used to calculate these ratios are each expressed as a mass flowrate in the same units (mass per unit time).

More specifically, the amount of airflow through the engine's bypass passage can be determined using a fan pressure ratio for the primary fan 152, a rotational speed of the primary fan 152, or both while the engine is operating at the rated speed during standard day operating conditions, and the primary fan outer fan area, $A_{P\_Out}$. The amount of airflow through the inlet duct 180 can be determined using a fan pressure ratio for the primary fan 152, a rotational speed of the primary fan 152, or both while operating at a rated speed during standard day operating conditions, and the primary fan inner fan area, $A_{P\_In}$. The amount of airflow through the fan duct 172 and the amount of airflow through the core duct 142 can be determined based on the amount of airflow through the inlet duct 180 while the engine is operating at the rated speed during standard day operating conditions; a fan pressure ratio, a rotational speed, or both of the secondary fan 184 while the engine is operating at the rated speed during standard day operating conditions; and the secondary fan outer fan area, $A_{S\_Out}$, and the secondary fan inner fan area, $A_{S\_In}$.

As alluded to earlier, the inventors found during the course of gas turbine engine design—i.e., designing gas turbine engines (e.g., ducted gas turbine engines) having a variety of different primary fan and secondary fan characteristics—and evaluating an overall propulsive efficiency, significant relationships exist in a ratio of an airflow through a bypass passage and through a third stream to an airflow through a core duct (referred to herein as a thrust to power airflow ratio), as well as in a ratio of an airflow through the third steam to the airflow through the core duct (referred to herein as a core bypass ratio). These relationships can be thought of as an indicator of the ability of a gas turbine engine to maintain or even improve upon a desired propulsive efficiency via the third stream and, additionally, indicating an improvement in the gas turbine engine's packaging concerns and weight concerns, and thermal management capabilities.

As will be appreciated, it may generally be desirable to increase a fan diameter of the primary fan 152 in order to provide a higher thrust to power airflow ratio, which typically correlates to a higher overall propulsive efficiency. However, increasing the fan diameter too much may actually result in a decrease in propulsive efficiency at higher speeds due to a drag from the fan blades. Further, increasing the fan diameter too much may also create prohibitively heavy fan blades, creating installation problems due to the resulting forces on the supporting structure (e.g., frames, pylons, etc.), exacerbated by a need to space the engine having such fan blades further from a mounting location on the aircraft to allow the engine to fit, e.g., under/over the wing, adjacent to the fuselage, etc.

Similarly, it may generally be desirable to increase an airflow through the fan duct relative to the core duct in order to provide a higher core bypass ratio, as such may also generally correlate to a higher overall propulsive efficiency. Notably, however, the higher the core bypass ratio, the less airflow provided to the core of the gas turbine engine. For a given amount of power needed to drive, e.g., a primary fan and a secondary fan of the gas turbine engine, if less airflow is provided, either a maximum temperature of the core needs to be increased or a size of the primary fan or secondary fan needs to be decreased. Such a result can lead to either premature wear of the core or a reduction in propulsive efficiency of the gas turbine engine.

As noted above, the inventors of the present disclosure discovered bounding the relationships defined by the thrust to power airflow ratio and core bypass ratio can result in a gas turbine engine maintaining or even improving upon a desired propulsive efficiency, while also taking into account the gas turbine engine's packaging concerns and weight concerns, and also providing desired thermal management capabilities. The relationship discovered, infra, can identify an improved engine configuration suited for a particular mission requirement, one that takes into account installation, packaging and loading, thermal sink needs and other factors influencing the optimal choice for an engine configuration.

In addition to yielding an improved gas turbine engine, as explained in detail above, utilizing this relationship, the inventors found that the number of suitable or feasible gas turbine engine designs incorporating a primary fan and a secondary fan, and defining a third stream, capable of meeting both the propulsive efficiency requirements and packaging, weight, and thermal sink requirements could be greatly diminished, thereby facilitating a more rapid down selection of designs to consider as a gas turbine engine is being developed. Such a benefit provides more insight to the requirements for a given gas turbine engine well before specific technologies, integration and system requirements are developed fully. Such a benefit avoids late-stage redesign.

The desired relationships providing for the improved gas turbine engine, discovered by the inventors, are expressed as Equations (1) and (2):

$$TPAR = (A_B + A_{3S})/A_C \quad (1)$$
$$CBR = A_{3S}/A_C \quad (2)$$

where TPAR is a thrust to power airflow ratio, CBR is a core bypass ratio, $A_B$ is an airflow through a bypass passage of the gas turbine engine while the engine is operated at a rated speed during standard day operating conditions, $A_{3S}$ is an airflow through a third stream of the gas turbine engine while the engine is operated at the rated speed during standard day operating conditions, and $A_C$ is an airflow through a core of the gas turbine engine while the engine is operated at the rated speed during standard day operating conditions. The airflow through the core of the gas turbine engine may refer to an airflow through an upstream end of the core (e.g., an airflow through a first stage of a high pressure compressor of the core). $A_B$, $A_{3S}$, and $A_C$ are each expressed as mass flowrate, with the same units as one another.

Values for various parameters of the influencing characteristics of an engine defined by Equations (1) and (2) are set forth below in Table 1:

TABLE 1

| Symbol | Description | Ranges appropriate for using Expression (1) |
|---|---|---|
| $R_1/R_3$ | Tip radius ratio | 1.35 to 10, such as 2 to 7, such as 3 to 5, such as at least 3.5, such as at least 3.7, such as at least 4, such as up to 10, such as up to 7 |
| $RqR_{Sec.-Fan}$ | Secondary fan radius ratio | 0.2 to 0.9, such as 0.2 to 0.7, such as 0.57 to 0.67 |
| $RqR_{Prim.-Fan}$ | Primary fan radius ratio | 0.2 to 0.4, such as 0.25 to 0.35 |
| TPAR | Thrust to power airflow ratio | 3.5 to 100, such as 4 to 75 (see also, TABLE 2, below) |
| CBR | Core Bypass Ratio | 0.1 to 10, such as 0.3 to 5 (see also, TABLE 2, below) |

Figure 5A:
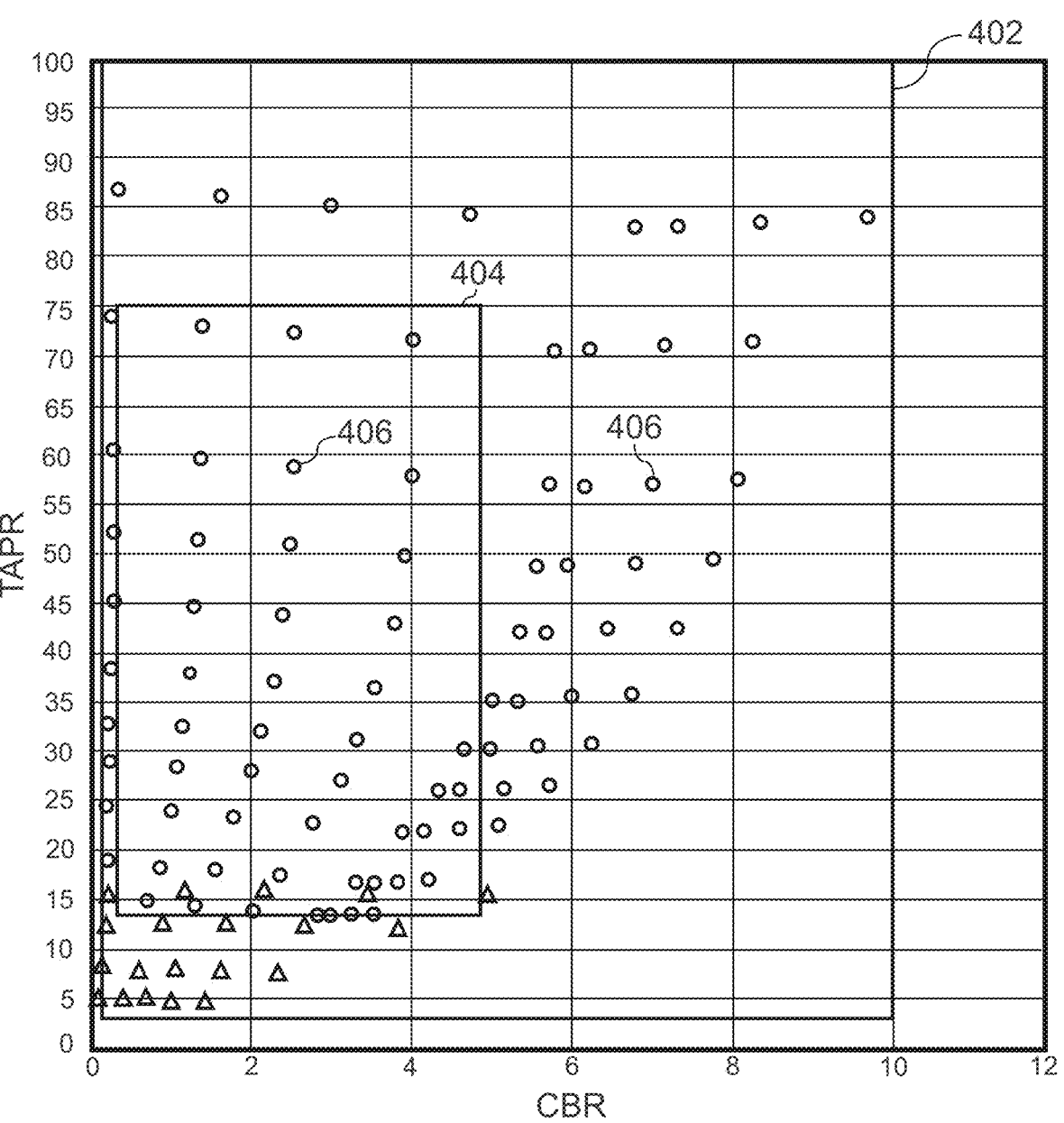
FIGS. 5A and 5B are graphs depicting a range of thrust to power airflow ratios and core bypass ratios in accordance with various example embodiments of the present disclosure.
Figure 5B:
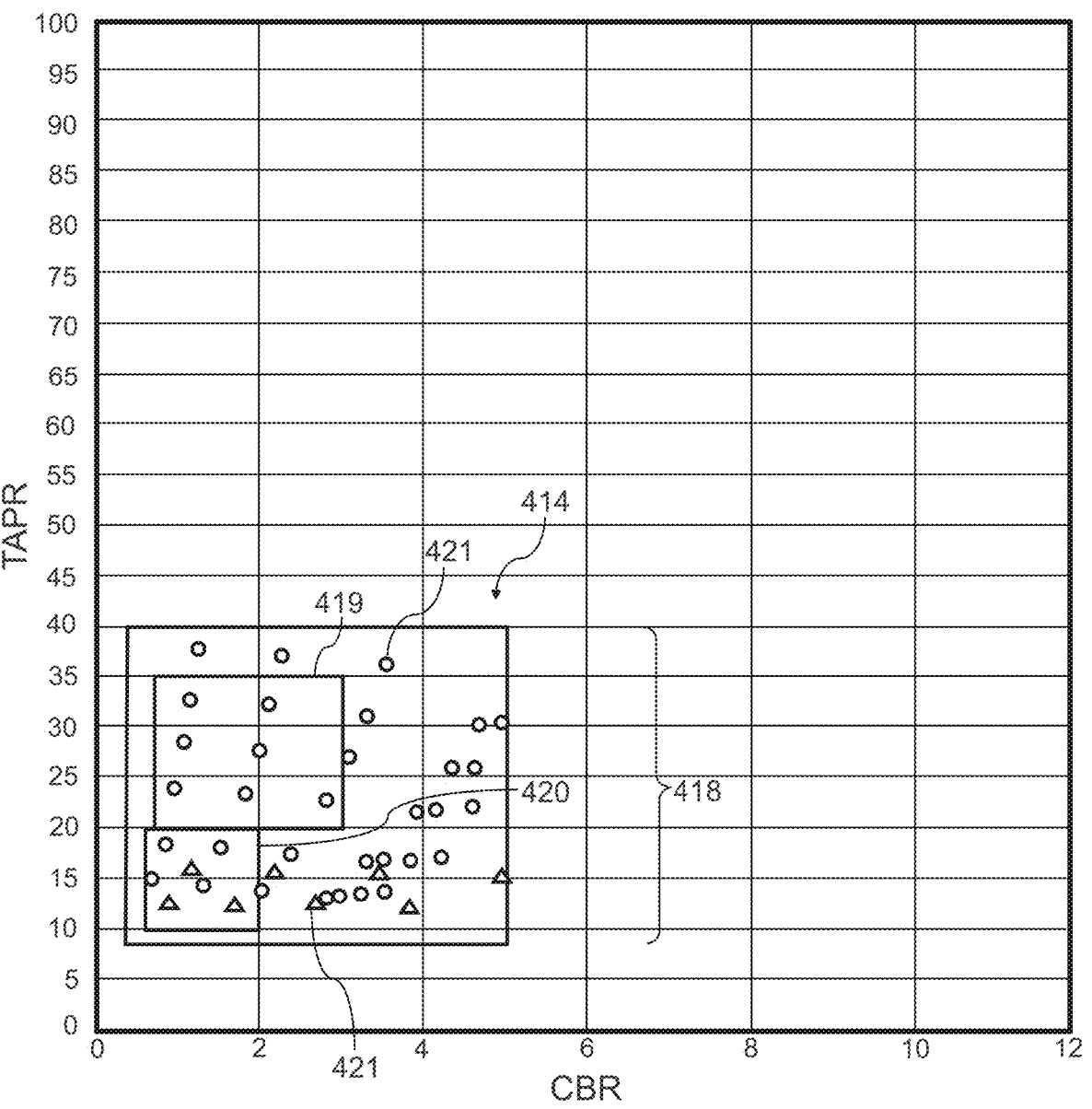

Referring now to FIGS. 4A through 4H and 5A through 5C, the relationships between the various parameters of Equations (1) and (2) of exemplary gas turbine engines are illustrated in accordance with one or more exemplary embodiments of the present disclosure. In particular, FIGS. 4A through 4H provide a table including numerical values corresponding to several of the plotted gas turbine engines in FIGS. 5A through 5C. FIGS. 5A through 5C are plots of gas turbine engines in accordance with one or more exemplary embodiments of the present disclosure, showing the TPAR (Y-Axis) and the CBR (X-axis). FIGS. 5A through 5B highlight preferred subranges, including subranges for ducted engines, as discussed hereinbelow.

Referring particularly to FIG. 5A, a first range 402 and a second range 404 are provided, and exemplary embodiments 406 are plotted. The exemplary embodiments 406 include a variety of gas turbine engine types in accordance with aspects of the present disclosure. The first range 402 corresponds to a TPAR between 3.5 and 100 and a CBR between 0.1 and 10. The first range 402 captures the benefits of the present disclosure across the variety of engine types. The second range 404 corresponds to a TPAR between 14 and 75 and a CBR between 0.3 and 5. The second range 404 may provide more desirable TPAR and CBR relationships across engine types to achieve propulsive efficiency, while still providing packaging and weight benefits, thermal benefits, etc.

Referring particularly to FIG. 5B, a third range 414, a fourth range 418, a fifth range 419, and a sixth range 420 are provided, and exemplary embodiments 421 are plotted. The exemplary embodiments 421 include a variety of ducted gas turbine engines in accordance with aspects of the present disclosure. In particular, the exemplary embodiments 421 include a variety of gas turbine engines having a ducted primary fan, similar to the exemplary embodiments described herein with reference to FIGS. 1, 6, and 7. The third range 414 corresponds to a TPAR between 3.5 and 40 and a CBR between 0.3 and 5. The third range 414 captures the benefits of the present disclosure for ducted gas turbine engines.

The fourth range 418 corresponds to a TPAR between 8 and 40 and a CBR between 0.2 and 5. The fourth range 418 captures the benefits of the present disclosure for ducted gas turbine engines in a geared configuration (see, e.g., FIGS. 6 and 7). The TPAR is limited by an allowable nacelle drag and fan operability.

The fifth range 419 corresponds to ducted gas turbine engines in a geared configuration having a variable pitch primary fan (see FIGS. 1, 6, and 7) and the sixth range 420 corresponds to ducted gas turbine engines in a geared configuration having a fixed pitch primary fan. Inclusion of a variable pitch primary fan may allow for a larger fan, but may also necessitate higher heat rejection abilities for the gas turbine engine, which may, in turn increase a CBR. The fifth range 419 corresponds to a TPAR between 20 and 35 and a CBR between 0.5 and 3, and the sixth range 420 corresponds to a TPAR between 10 and 20 and a CBR between 0.3 and 2. It will be appreciated that in other exemplary aspects, a gas turbine engine of the present disclosure in a ducted, geared, variable pitch configuration may have TPAR between 15 and 40 and a CBR between 0.3 and 5, and a gas turbine engine in a ducted, geared, fixed pitch configuration may have TPAR between 8 and 25 and a CBR between 0.3 and 5.

The inventors of the present disclosure have found that the TPAR values and CBR values in the third, fourth, fifth, and sixth ranges 414, 418, 419, 420 shown may provide desirable propulsive benefits, while still enabling operation of the core in a reasonable manner, and balancing installation and thermal load considerations.

Table 2, below, provides a summary of TPAR values and CBR values for various gas turbine engines in accordance with one or more exemplary aspects of the present disclosure.

TABLE 2

| Engine Type | TPAR Value | CBR Value |
|---|---|---|
| All Aeronautical Gas Turbine Engines ("GTE") | 3.5 to 100 | 0.1 to 10 |
| All Aeronautical GTE | 4 to 75 | 0.3 to 5 |
| Ducted Gas GTE | 3.5 to 40 | 0.2 to 5 |
| Ducted, Geared GTE | 8 to 40 | 0.2 to 5 |
| Ducted, Geared, Variable Pitch GTE | 15 to 40 | 0.3 to 5 |

TABLE 2-continued

| Engine Type | TPAR Value | CBR Value |
| --- | --- | --- |
| Ducted, Geared, Variable Pitch GTE | 20 to 35 | 0.5 to 3 |
| Ducted, Geared, Fixed-Pitch GTE | 8 to 25 | 0.2 to 5 |
| Ducted, Geared, Fixed-Pitch GTE | 10 to 20 | 0.3 to 2 |

Figure 6:
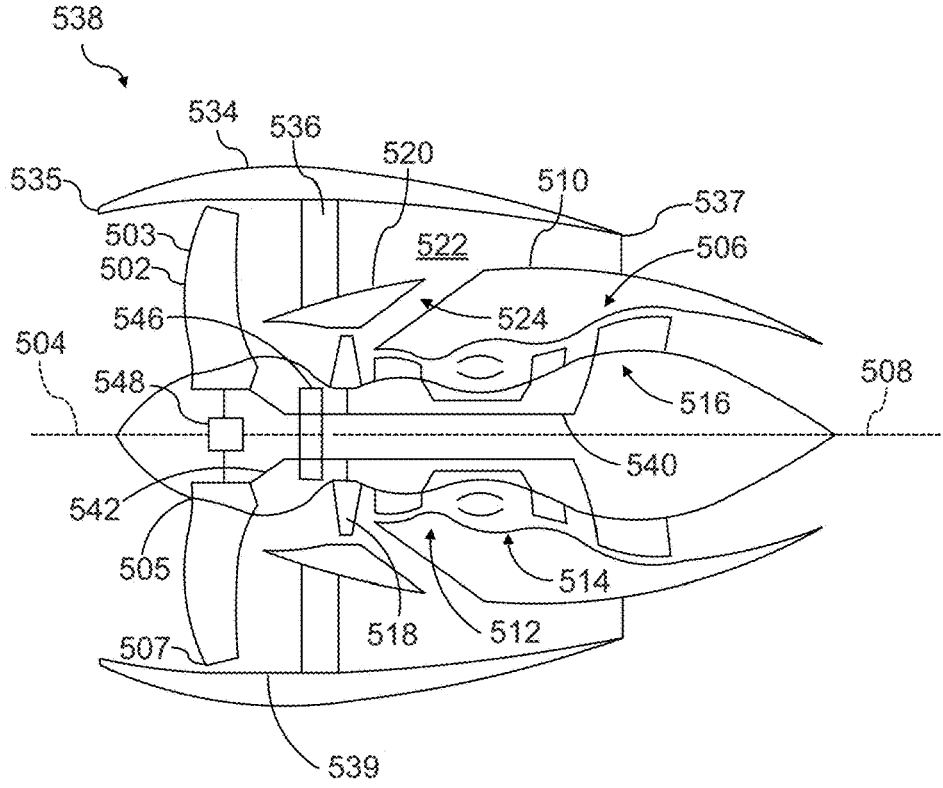
FIG. 6 is a schematic view of a geared, ducted, turbofan engine in accordance with an exemplary aspect of the present disclosure.
Figure 7:
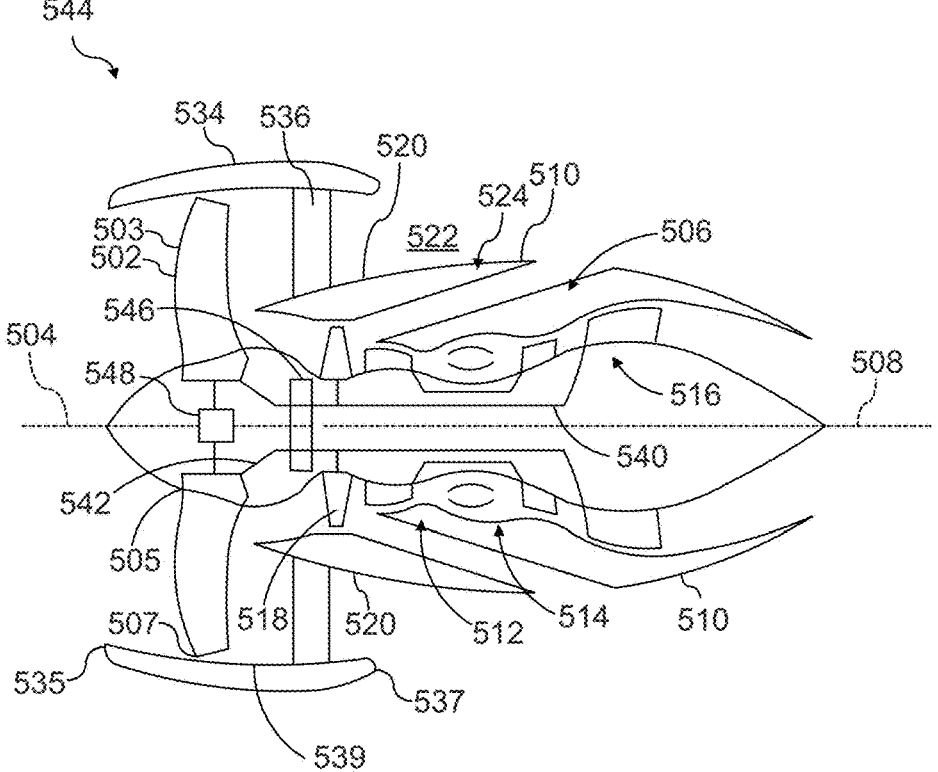
FIG. 7 is a schematic view of a geared, ducted, turbofan engine in accordance with another exemplary aspect of the present disclosure.

For the purposes of Table 2, the term "ducted" refers to inclusion of an outer nacelle around a primary fan (see, e.g., FIGS. 1, 6, and 7); "geared" refers to inclusion of a reduction gearbox between the primary fan and a driving turbine (see, e.g., FIGS. 1, 6, and 7); "variable pitch" refers to inclusion of a pitch change mechanism for changing a pitch of fan blades on a primary fan (see, e.g., FIGS. 1, 6, and 7); "fixed pitch" refers to exclusion of a pitch change mechanism for changing a pitch of fan blades on a primary fan; "lower flight speed" refers to an engine designed to operate at a flight speed less than 0.85 Mach; and "higher flight speed" refers to an engine designed to operate at a flight speed higher than 0.85 Mach.

Reference will now be made to FIGS. 6 and 7, each depicting schematically an engine architecture associated with the present disclosure.

Each respective gas turbine engine 538, 544 of FIGS. 6 and 7 generally includes a primary fan 502 (which is also referred to herein as a "primary rotor" or "rotor") rotatable about a rotor axis 504 and a turbomachine 506 rotatable about a longitudinal axis 508 (which is also referred to herein as an "engine centerline"). The primary fan 502 includes a plurality of fan blades 503. Each fan blade 503 includes a root 505 and a tip 507. The turbomachine 506 is surrounded at least in part by a core cowl 510 and includes a compressor section 512, a combustion section 514, and a turbine section 516 in serial flow order. In addition to the primary fan 502, the gas turbine engines of FIGS. 6 and 7 each also include a ducted mid-fan or secondary fan 518. The gas turbine engines 538, 544 each include a fan cowl 520 surrounding the secondary fan 518.

The gas turbine engines 538, 544 each also define a bypass passage 522 downstream of the respective primary fan 502 and over the respective fan cowl 520 and core cowl 510, and further define a third stream 524 extending from a location downstream of the respective secondary fan 518 to the respective bypass passage 522 (at least in the embodiments depicted; in other embodiments, the third stream 524 may instead extend to a location downstream of the bypass passage 522).

The gas turbine engines 538, 544 are each configured as turbofan engines, and more specifically as geared, ducted turbofan engines. In such a manner, the gas turbine engines 538, 544 each include an outer nacelle 534 surrounding the primary fan 502, and the primary fan 502 of each is therefore configured as a ducted fan. Further, each of the gas turbine engines 538, 544 includes outlet guide vanes 536 extending through the bypass passage 522 to the outer nacelle 534 from the fan cowl 520, the core cowl 510, or both. As shown, the OGVs 536 can include serrated leading edges 547, which can share certain similar features with the previously-described serrated leading edges 169.

The outer nacelle 534 includes an inlet 535, an outlet 537, and an acoustic treatment 539. Other examples of the outer nacelle 534 may include additional or alternative components.

The outer nacelle 534 protects and/or insulates the primary fan 502 and extends along the longitudinal axis 508 from the inlet 535 to the outlet 537. The outer nacelle 534 is sized to at least partially encompass the turbomachine 506. In some embodiments, the outlet 537 may be disposed aft of the third stream (FIG. 6). In some embodiments, the outlet 537 may be disposed forward of the third stream (FIG. 7). The outer nacelle 534 features a streamlined shape to improve aerodynamic performance. In some embodiments, the outer nacelle 534 can be streamlined or tapered such that the inlet 535 or a forward end portion of the outer nacelle 534 has a wider diameter than the outlet 537 or an aft end portion of the outer nacelle 534.

The acoustic treatment 539 can acoustically insulate the outer nacelle 534 during operation, thereby desirably reducing the amount of noise emitted by the gas turbine engines 538, 544. The acoustic treatment 539 can comprise a multi-layered liner disposed on a circumferential interior surface of the outer nacelle 534. When disposed on the circumferential interior surface of the outer nacelle 534, the multi-layered liner can comprise a radially innermost porous layer, an intermediate partitioned layer, and a radially outermost impervious layer. In some embodiments, the acoustic treatment 539 can be disposed on the portion of the interior surface of the outer nacelle 534 extending between the primary fan 502 and the outlet guide vanes 536.

The geared, ducted, turbofan engines 538, 544 include the engine shaft 540 driven by the turbine section 516 and the fan shaft 542 rotatable with the primary fan 502. However, the exemplary geared, ducted, turbofan engines 538, 544 further include a gearbox 546 mechanically coupling the engine shaft 540 to the fan shaft 542. The gearbox 546 allows the primary fan 502 to rotate at a slower speed than the engine shaft 540, and thus at a slower speed than the secondary fan 518.

Notably, the exemplary geared, ducted, turbofan engines 538, 544 of FIGS. 6-7 further include a pitch change mechanism 548 operable with the primary fan 502 to change a pitch of the rotor blades of the primary fan 502. Such a pitch change mechanism may allow for an increased efficiency of the gas turbine engine.

In contrast to the gas turbine engine 538 of FIG. 6 where a fan duct outlet defined by the fan duct is upstream of a bypass passage outlet defined by the bypass passage, in the gas turbine engine 544 of FIG. 7, the fan duct outlet defined by the fan duct is downstream of the bypass passage outlet defined by the bypass passage.

Figure 8:
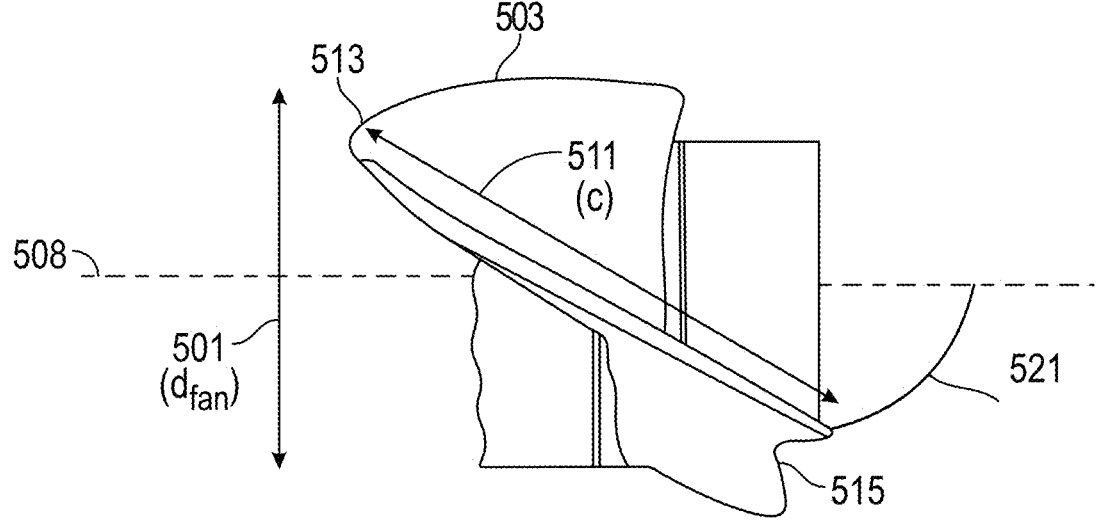
FIG. 8 is a top view of a fan blade for a gas turbine engine in accordance with an exemplary embodiment of the present disclosure.

FIG. 8 shows a top view of one of the fan blades 503 of the primary fan 502. Each fan blade 503 has a radial span extending from its root 505 at a 0% span position to its tip 507 at a 100% span position. The span S of the fan blade 503 is the difference in a radius of a leading edge at the tip 507 and the radius of the leading edge at the root 505.

Each fan blade 503 has a blade solidity (c/s). Blade solidity is defined as the ratio of a chord length (c) 511 to the circumferential spacing(s) between the fan blade 503 and a nearest adjacent fan blade 503, measured at a 75% span position of the fan blade 503. As shown in FIG. 8, the chord length 511 is a straight-line distance between a leading edge 513 and a trailing edge 515 of the fan blade. The spacing(s) between adjacent fan blades 503 is calculated by multiplying a diameter 501 (also referred to herein as a "fan diameter" or "rotor diameter") of the primary fan 502 by $\pi$ and dividing the product by the number ($N_b$) of fan blades 503. In some embodiments, enhanced performance (e.g., increased propulsive efficiency) can be observed when the blade solidity of the gas turbine engine is greater than or equal to 0.8 and less than or equal to 2. In some embodiments, enhanced performance can be observed when the blade solidity is greater than or equal to 0.8 and less than or equal to 1.5. In some embodiments, enhanced performance can be observed when the blade solidity is greater than or equal to 1 and less than or equal to 2. In some embodiments, enhanced performance can be observed when the blade solidity is greater than or equal to 1.25 and less than or equal to 1.75.

Each of the plurality of fan blades 503 further defines a stagger angle (γ) 521. The stagger angle 521 is an angle between the longitudinal axis 508 and a chord line (along which the chord length 511 is measured) as measured at the 75% span position of the respective fan blade 503. In some embodiments, the stagger angle 521 can range from 30 degrees to 75 degrees. In some embodiments, the stagger angle 521 can range from 30 degrees to 60 degrees.

It should be understood that other fan blades disclosed herein (e.g., the fan blades 154) have blade solidities, chord lengths, and stagger angles, and these characteristics can be within any of the above-described ranges for their corresponding characteristics.

Figure 9:
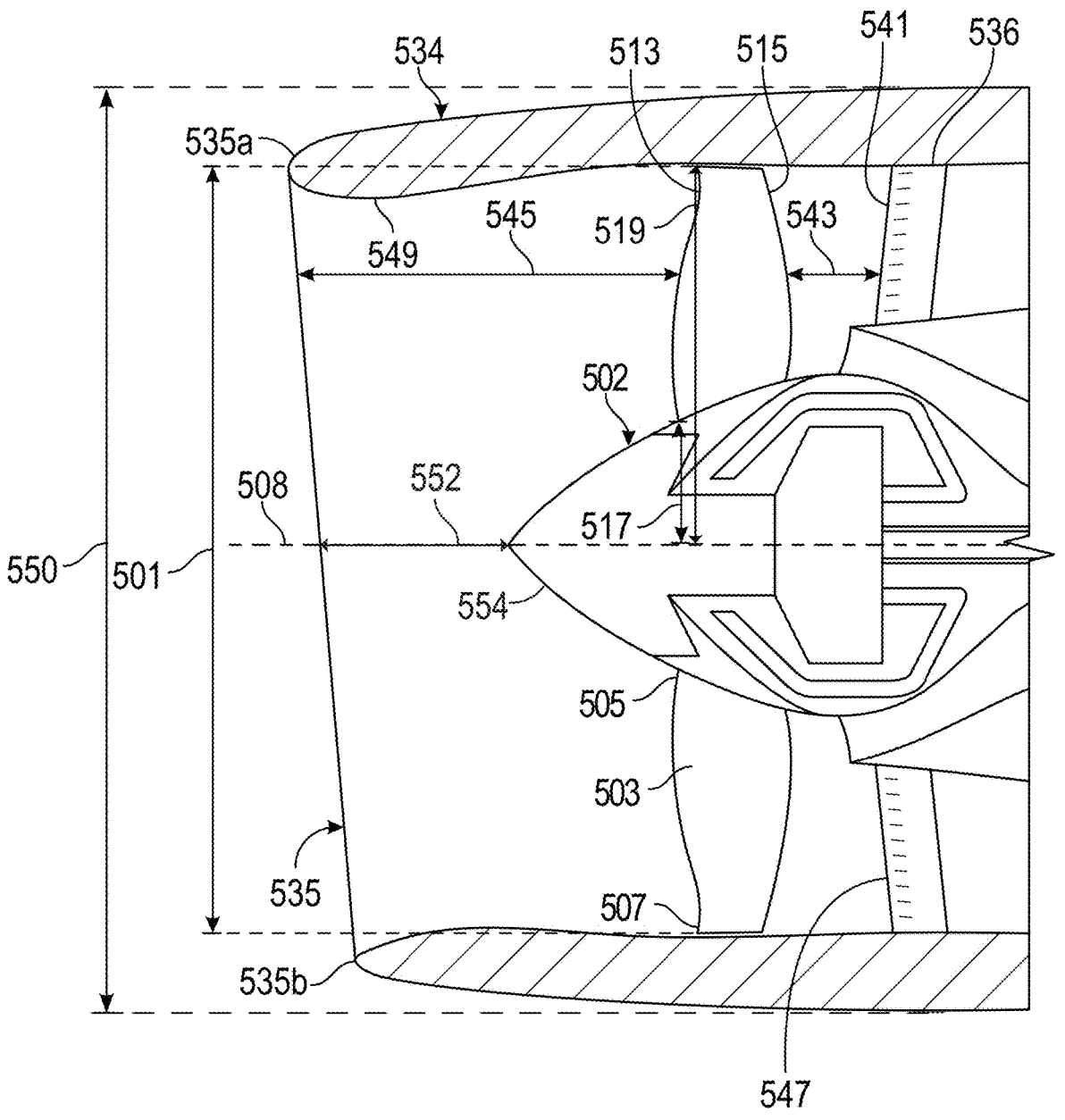
FIG. 9 is a partial view of a gas turbine engine with an acoustic spacing in accordance with an exemplary embodiment of the present disclosure.

Now referring to FIG. 9, which shows a cross-sectional view of a forward portion of a gas turbine engine (for example, either one of gas turbine engines 538, 544), the primary fan 502 preferably has a low radius ratio (rr), which is a ratio of a radius 517 of a leading edge of the root 505 or 0% span position of the fan blade 503 to a radius 519 of a leading edge of the blade tip 507 or 100% span position of the fan blade 503, both measured from the longitudinal axis 508 at the leading edge 513 of the fan blade 503 as shown in FIG. 9. In some embodiments, the radius ratio (rr) can be between 0.2 and 0.4 and/or between 0.2 and 0.35. In some examples, the radius ratio (rr) can be between 0.25 and 0.35 and/or between 0.25 and 0.3.

It should be understood that other fans disclosed herein (e.g., the primary fans 152) have radius ratios, and these radius ratios can be within any of the above-described ranges.

The inventors sought to improve engine performance characteristics including propulsive efficiency, drag, ease of installation, overall engine length (e.g., the length of the engine from inlet to nozzle), fan case size, core engine size, and weight (e.g., staying within a maximum weight budget). In some embodiments, the OGVs (e.g., OGVs 162, 536) were mounted to a fan frame, along with the primary fan (e.g., primary fans 152, 502) and a gearbox assembly. This meant that the OGVs would be located relatively close to the primary fan so that a more compact engine and efficient (in terms of strength/weight) load bearing fan frame could be realized. However, the resulting proximity of the primary fan to the OGVs was found to generate more noise than desired. From an acoustics standpoint, it is generally desirable to space the primary fan and the OGVs further apart from each other. However, spacing the primary fan and the OGVs further apart change can impact the placement of other subsystems and adversely affect overall performance, e.g., gearbox assembly placement and resulting load balances associated with the fan frame, fan frame length, overturning moments, and overall weight of a nacelle, either an engine with a long fan case or an engine with a short fan case. Engines with short fan cases are described in paragraphs [0083]-[0092] of U.S. Patent Application Publication No. 2022/0042461, which have a fan nozzle terminating well upstream of the core nozzle located downstream of the low pressure turbine. U.S. Patent Application Publication No. 2022/0042461 is incorporated by reference herein in its entirety. As each change impacts other systems, there is a need to understand what combination, or extent of modifications, provide improved acoustic performance without unacceptably negatively impacting other aspects of the engine architecture, e.g., propulsive efficiency, as mentioned above. Thus, it was exceedingly more challenging to determine how to implement changes without affecting other aspects of the architecture upon which increased propulsive efficiency was dependent upon, e.g., the thrust to power airflow ratio and the core bypass ratio, than simply making modifications to reduce the noise generated.

Taking these things in mind, the inventors found that gas turbine engines, such as the gas turbine engines 100, 538, 544 of FIGS. 1, 6, and 7, embodying the below-described characteristics have improved acoustic characteristics, but without imposing severe and unacceptable penalties on the thrust to power airflow ratio or core bypass ratio of the architecture or engine aero-performance. For example, the inventors found that gas turbine engines with desirable placement of OGVs, such as the OGVs 162 of FIG. 1 or the OGVs of 536 of FIGS. 6-7, may result in the maintaining of or improving upon a desired propulsive efficiency, while improving the turbofan engine's acoustic properties.

Reference is now made back to FIG. 9, which is a schematic, partial cross-sectional view of a gas turbine engine in accordance with the disclosure. For any exemplary gas turbine engines (e.g., any one of gas turbine engines 100, 538, 544) having a blade solidity greater than or equal to 0.8 and less than or equal to 2, the inventors determined that such gas turbine engines are characterized by a blade effective acoustic length (BEAL) that can be used to determine a range of configurations that provide improved acoustic performance. The BEAL is determined from Equation (3) below:

$$BEAL = \frac{2c^2}{S(1 - rr)N_b} \cos(\gamma) \tag{3}$$

where c is the chord length at 75% span, rr is the radius ratio of the fan, S is the full span of the fan blade (i.e., as measured at a 100% span position at the blade leading edge), γ is the stagger angle, and $N_b$ is the number of fan blades.

Exemplary ranges for the elements of the gas turbine engines described herein are provided below in Table 3. The ranges in Table 3 are not limiting, and gas turbine engines may have elements in any other range disclosed herein. As shown in Table 3, the exemplary ranges for certain parameters may vary depending on a corresponding range of a fan blade diameter (FBD) of the primary fan. For example, the fan blade diameter for three different ranges, FBD #1, FBD #2, and FBD #3 are shown below.

65≤FBD #1<80 inches
80≤FBD #2<95 inches
95≤FBD #3<115 inches

TABLE 3

| Symbol | Description | Exemplary Ranges for Use with BEAL |
|--------|-------------|-------------------------------------|
| C | Chord length at 75% span position (ranges based on FBD) | 5" to 28" (for FBD#1) 6" to 33" (for FBD#2) 7" to 35" (for FBD#3) |
| S | Span of fan blade at 100% span position (ranges based on FBD) | 24" to 30" (for FBD#1) 28" to 36" (for FBD#2) 32" to 40" (for FBD#3) |
| rr | Radius ratio (range) | 0.2 to 0.35 |
| Nv | Number of OGVs (ranges) | 1.5 Nb to 3 Nb, 1.8 Nb to 2.4 Nb, 2.0 Nb to 2.5 Nb, or 2.2 Nb to 2.6 Nb |
| γ | Stagger angle (ranges) | 30°-75° or 30°-60° |
| $N_b$ | Number of fan blades (ranges) | 14-26, 20-24, 20-22, or 22 |

As shown in FIG. 9, an acoustic spacing 543 (As) is a length, measured parallel to the longitudinal axis 508, extending between the trailing edge 515 of the fan blade 503 and the leading edge 541 of a corresponding one of the OGVs 536. The acoustic spacing is also depicted herein with respect to the gas turbine engine 100 as the acoustic spacing 171 in FIGS. 1-2.

An acoustic spacing ratio (ASR) can be determined using the BEAL, ratio of Nv/Nb, and the acoustic spacing (As) as shown below in Equation (4):

$$ASR = \frac{1}{\left(\frac{Nv}{Nb}\right)} \cdot \frac{As}{BEAL} \qquad (4)$$

Varying the acoustic spacing ratio can impact gas turbine engine performance in different ways. For example, a gas turbine engine with a higher acoustic spacing ratios can emit less noise. In some embodiments, a gas turbine engine with lower acoustic spacing ratios can reduce the size of the gas turbine engine, thereby beneficially reducing fuel consumption and emissions generated by the gas turbine engine.

The inventors found that gas turbine engines with acoustic spacing ratios from 1.4 to 3.2 exhibited a desirable balance between noise emissions, engine size, and propulsive efficiency, thereby featuring enhanced performance over conventional gas turbine engines. In some embodiments, enhanced results can be achieved with acoustic spacing ratios from 1.5 to 3.1 or 1.6 to 3.0. In some embodiments, enhanced performance can be achieved with acoustic spacing ratios from to 1.6 to 2.4 or 2.0 to 3, depending on a desired acoustic spacing and fan blade design.

As further shown in FIG. 9, an inlet length 545 is an axial distance between the leading edge 513 of the fan blade 503 and the inlet 535. The acoustic spacing 543, chord length 511 (FIG. 8), and inlet length 545 are defined at (i.e., measured at) at the 75% span position of the fan blade 503.

The ducted gas turbine engines 538, 544 define an inlet length ratio. As used herein, the term "inlet length ratio" refers to the ratio of the inlet length 545 to the fan diameter 501. Enhanced performance of ducted gas turbine engines 538, 544 can be achieved with inlet length ratios between 0.15 and 0.5. In some embodiments, ducted gas turbine engines 538, 544 with inlet length ratios less than or equal to 0.5 can desirably feature enhanced performance compared to conventional ducted gas turbine engines due to reduced fan case length, reduced drag, and reduced fan distortion. In some embodiments, enhanced performance can be achieved with inlet length ratios between 0.15 and 0.4. In some embodiments, enhanced performance can be achieved with inlet length ratios between 0.15 and 0.3.

As further shown in FIG. 9, the forward-most position of the inlet 535 can vary, e.g., between a twelve o'clock position and a six o'clock position. For the illustrated outer nacelle 534, the inlet length 545 is the average the axial distance between the leading edge 513 of the fan blade 503 and the top portion 535a of the inlet 535, and the axial distance between the leading edge 513 the fan blades 503 and the bottom portion 535b of the inlet 535, i.e., the inlet length 545 is the average of the maximum and minimum distances from the leading edge 513 of the fan blade 503 and the inlet 535, measured at the 75% span position of the fan blade 503, the inlet 535 and the outer nacelle 534 can define a lip 549 extending along the circumference of the inlet 535 at the forward-most edge portion of the outer nacelle 534. As shown, the lip 549 can be contoured or curved to improve aerodynamic performance and/or reduce flow separation of air entering the inlet 535. For example, the lip 549 can be contoured such that the outer nacelle 534 forms an hourglass shape (in cross-section) forward of the fan 502.

In some examples, the gas turbine engines disclosed herein (e.g., gas turbine engines 538, 544) can define an inlet-to-nacelle (ITN) ratio, which is a ratio of the inlet length 545 to a nacelle outer diameter 550. The nacelle outer diameter 550 is the largest diameter of the nacelle 534. In some examples, enhanced performance of gas turbine engines can be achieved with ITN ratios from 0.23 to 0.35. Gas turbine engines with ITN ratios can desirably feature enhanced performance compared to conventional gas turbine engines due to reduced fan case length, reduced drag, and reduced fan distortion. In some examples, further enhanced performance can be achieved with ITN ratios from 0.27 to 0.35, and from 0.30 to 0.33.

As further shown in FIG. 9, the gas turbine engines disclosed herein (e.g., gas turbine engines 538, 544) define a disk spacing length 552. The disk spacing length 552 is the distance between a forwardmost end of a fan disk 554 of the primary fan 502 and the intersection of the inlet 535 taken along the longitudinal axis 508. A disk-to-blade diametric (DBD) ratio is the ratio of the disk spacing length 552 to the fan diameter 501. The inventors of the present disclosure found that enhanced performance of gas turbine engines can be achieved with disk-to-blade diametric ratios that are less than or equal to 0.6, and in some examples with disk-to-blade diametric ratios that range from 0.09 to 0.59, 0.15 to 0.35, and 0.19 to 0.27. Gas turbine engines with disk-to-blade diametric ratios in these ranges can desirably feature enhanced performance compared to conventional gas turbine engines due to reduced drag and reduced fan distortion.

Further benefits have been identified when a gas turbine engine is configured to have a DBD ratio in the ranges disclosed above, in combination with an ITN ratio in the ranges disclosed above. For example, a gas turbine engine can have a DBD ratio of 0.22 and an ITN ratio of 0.27, both of which meet at least one of the stated desirable ranges for the DBD and ITN ratios. It should be noted that a gas turbine engine can be configured to meet any combination of the disclosed DBD ratios and the disclosed ITN ratios.

In some examples, enhanced performance of the gas turbines disclosed herein can be achieved with disk-to-nacelle ratios below 0.47. A disk-to-nacelle diametric (DND) ratio is the ratio of the disk spacing length 552 to the nacelle diameter 550. The inventors of the present disclosure have found that enhanced performance of gas turbine engines can be achieved with disk-to-nacelle diametric ratios that range from 0.07 to 0.47, 0.15 to 0.35, and 0.19 to 0.27. Gas turbine engines with disk-to-nacelle diametric ratios in these ranges can desirably feature enhanced performance compared to conventional gas turbine engines due to reduced drag and reduced fan distortion. Further benefits have been identified when a gas turbine engine is configured to have a DND ratio in the ranges disclosed above, in combination with an ITN ratio in the ranges disclosed above. For example, a gas turbine engine can have a DND ratio of 0.21 and an ITN ratio of 0.27, both of which meet at least one of the stated desirable ranges for the DND and ITN ratios. It should be noted that any gas turbine engine disclosed herein can be configured to meet any combination of the disclosed DND ratios and the disclosed ITN ratios.

In some examples, enhanced performance of gas turbine engines can unexpectedly be achieved with disk-to-inlet length (DIL) ratios within the range from 0.30 to 0.80. A disk-to-inlet ratio is the ratio of the disk spacing length 552 to the inlet length 545. The inventors of the present disclosure have found that enhanced performance of gas turbine engines can be also be achieved with disk-to-inlet ratios that range from 0.4 to 0.8, 0.4 to 0.7, and 0.45 to 0.67. Gas turbine engines with disk-to-inlet ratios in these ranges can desirably feature enhanced performance compared to conventional gas turbine engines due to reduced drag and reduced fan distortion. Further benefits have been identified when a gas turbine engine is configured to have a DIL ratio in the ranges disclosed above, in combination with an ITN ratio in the ranges disclosed above. For example, a gas turbine engine can have a DIL ratio of 0.49 and an ITN ratio of 0.27, both of which meet at least one of the stated desirable ranges for the DIL and ITN ratios. It should be noted that any gas turbine engine disclosed herein can be configured to meet any combination of the disclosed DIL ratios and the disclosed ITN ratios.

Table 4, below, illustrates exemplary engines with the disk-to-blade diametric (DBD) ratios, disk-to-nacelle diametric (DND) ratios, and disk-to-inlet (DIL) ratios in the ranges disclosed herein. For each exemplary gas turbine engine disclosed in Table 2, the gas turbine engine has an ITN ratio that is 0.23 to 0.35.

TABLE 4

| Engine | fan-disk spacing length (in) 552 | fan diameter (in) 501 | nacelle diameter (in) 550 | inlet length (in) 545 | DBD Ratio | DND Ratio | DIL Ratio |
|--------|------|------|------|------|------|------|------|
| 1 | 24 | 46 | 64 | 36 | 0.52 | 0.38 | 0.67 |
| 2 | 26 | 53 | 75 | 37 | 0.49 | 0.35 | 0.70 |

TABLE 4-continued

| Engine | fan-disk spacing length (in) 552 | fan diameter (in) 501 | nacelle diameter (in) 550 | inlet length (in) 545 | DBD Ratio | DND Ratio | DIL Ratio |
|--------|------|------|------|------|------|------|------|
| 3 | 35 | 61 | 87 | 48 | 0.57 | 0.40 | 0.73 |
| 4 | 24 | 69 | 96 | 37 | 0.35 | 0.25 | 0.65 |
| 5 | 21 | 78 | 102 | 37 | 0.27 | 0.21 | 0.57 |
| 6 | 22 | 78 | 104 | 39 | 0.28 | 0.21 | 0.56 |
| 7 | 48 | 93 | 115 | 63 | 0.52 | 0.42 | 0.76 |
| 8 | 17 | 88 | 116 | 35 | 0.19 | 0.15 | 0.49 |
| 9 | 21 | 80 | 107 | 32 | 0.26 | 0.20 | 0.66 |
| 10 | 10 | 115 | 135 | 33 | 0.09 | 0.07 | 0.30 |
| 11 | 36 | 61 | 77 | 45 | 0.59 | 0.47 | 0.80 |

FIG. 10 discloses exemplary acoustic spacing ratios for some embodiments of gas turbine engines as described herein. It should be understood that each engine disclosed in FIG. 11 is exemplary; thus, this table should not be understood to be limiting. Engines #1, 2, 4, 5, and 19 are engines with fan blades having fan diameters in the FBD #1 range, Engines #3, 6, 7, 8, 13, 14, 15, 17, 18, 20, 21, and 22 are engines with fan blades having fan diameters in the FBD #2 range, and Engines #9, 10, 11, 12, and 16 are engines with fan blades having fan diameters in the FBD #3 range. In each of the exemplary engines, the ASR is in the range of 1.5 to 16.0.

The inventors additionally found that the acoustic performance of a gas turbine engine can be further improved without negatively affecting other aspects of performance (e.g., propulsive efficiency) by using composite fan blades to enable a higher bypass ratio. A higher bypass ratio can reduce noise generation, thereby improving acoustic performance, by reducing the fan pressure ratio of the fan (e.g., from 1.5 to 1.4, or 1.35), and operating within the defined ranges for BEAL and ASR, as discussed above. Some gas turbine engines include turbomachines with bypass ratios of 10:1 to 17:1 and/or 12:1 to 15:1. For the higher bypass ratios in this range, the inventors found that composite blades, operating in the BEAL and ASR ranges disclosed herein, provide improved acoustic performance while also providing improved blade toughness when encountering flutter or foreign object impact. Improved blade toughness is a desirable characteristic for primary fan blades because foreign object impacts can result in blade loss and/or engine failure.

In some embodiments where it is desirable to reduce noise generation by using composite fan blades, the fan blades (e.g., any one of fan blades 154, 503) can be formed from composite materials. For example, a fan blade can comprise fiber-reinforced composite materials including a matrix and one or more plies with fibers. The fiber-reinforced composite material can be formed from a continuous wrap ply or from a plurality of individual plies. In some examples, the fiber-reinforced composite material can be formed with a plurality of fiber plies (or bands) interwoven in an in-plane and out-of-plane orientation by interleaving each of the plurality of fiber bands with one or more of the plurality of fiber bands previously laid down and in a different plane to fill the one or more gaps and define a uniformly covered multi-layered assembly. The plurality of fiber bands can also be interwoven in three or more different orientation angles, as described in U.S. Pat. No. 9,249,530, which is incorporated by reference herein in its entirety. In some examples, the fibers can be woven in three dimensions as described in U.S. Pat. No. 7,101,154, which is incorporated by reference herein in its entirety.

In some embodiments, the fiber types may be mixed within a given layer or ply. In some embodiments, different plies may be formed using different fiber types. In some embodiments, harder, shear resistant fibers may be incorporated at an impact surface, while the fiber near a back surface may be selected for enhanced energy absorption. Non-limiting examples of harder shear resistant fibers include metallic or ceramic fibers. Non-limiting examples of fibers with relatively high energy absorption include S-glass, aramid fibers (e.g., Kevlar® (sold by E. I. du Pont de Nemours and Company, Richmond Va.) and Twaron® (sold by Tejin Twaron, the Netherlands)), as well as oriented polyethylene fibers, such as Spectra® (sold by Honeywell Specialty Materials, Morris N.J.) and Dyneem® (sold by Dutch State Mines (DSM), the Netherlands).

In other exemplary embodiments of the present disclosure, a gas turbine engine may have still other suitable configurations. For example, in other embodiments, the gas turbine engine may include any suitable number of shafts or spools, compressors, or turbines (e.g., the gas turbine engine may be a three-spool engine having three turbines and associated spools).

Further, it will be appreciated that in at least certain exemplary embodiments of the present disclosure, a method of operating a gas turbine engine is provided. The method may be utilized with one or more of the exemplary gas turbine engines discussed herein, such as in FIGS. 1 through 11. The method includes operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5. For the exemplary method, the thrust to power airflow ratio is a ratio of an airflow through a bypass passage over a turbomachine of the gas turbine engine plus an airflow through a fan duct to an airflow through a core duct, and the core bypass ratio is a ratio of the airflow through the fan duct to the airflow through the core duct.

As will be appreciated from the description herein, various embodiments of a gas turbine engine are provided. Certain of these embodiments may be ducted turbofan engines (see FIGS. 1, 6 and 7). Another example of a ducted turbofan engine can be found in U.S. patent application Ser. No. 16/811,368 (Published as U.S. Patent Application Publication No. 2021/0108597), filed Mar. 6, 2020 and incorporated by reference herein in its entirety (FIG. 10, Paragraph [0062], et al.; including an annular fan case 13 surrounding the airfoil blades 21 of rotating element 20 and surrounding vanes 31 of stationary element 30; and including a third stream/fan duct 73 (shown in FIG. 10, described extensively throughout the application)). Various additional aspects of one or more of these embodiments are discussed below. These exemplary aspects may be combined with one or more of the exemplary gas turbine engine(s) discussed above with respect to the figures.

For example, in some embodiments, the engine may include a heat exchanger located in an annular duct, such as in a third stream. The heat exchanger may extend substantially continuously in a circumferential direction of the gas turbine engine (e.g., at least 300 degrees, such as at least 330 degrees).

In some embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

As such, it will be appreciated that an engine of such a configuration may be configured to generate at least 25,000 pounds and less than 80,000 of thrust during operation at a rated speed, such as between 25,000 and 50,000 pounds of thrust during operation at a rated speed, such as between 25,000 and 40,000 pounds of thrust during operation at a rated speed. Alternatively, in other exemplary aspects, an engine of the present disclosure may be configured to generate much less power, such as at least 2,000 pounds of thrust during operation at a rated speed.

In some embodiments, the fan (or rotor) may include twelve (12) fan blades. From a loading standpoint, such a blade count may allow a span of each blade to be reduced such that the overall diameter of the primary fan may also be reduced (e.g., to twelve feet in one exemplary embodiment). That said, in some embodiments, the fan may have any suitable blade count and any suitable diameter. In some embodiments, the fan includes at least eight (8) blades. In some embodiments, the fan may have at least twelve (12) blades. In some embodiments, the fan may have at least fourteen (14) blades. In some embodiments, the fan may have at least fifteen (15) blades. In some embodiments, the fan may have at least eighteen (18) blades. In some embodiments, the fan includes twenty-six (26) or fewer blades, such as twenty (20) or fewer blades. In some embodiments, the fan may include between fourteen (14) and twenty-six (26) fan blades. For example, the fan may include between twenty (20) and twenty-four (24) fan blades, between twenty (20) and twenty-two (22) fan blades, and/or twenty-two (22) fan blades.

Further, in some embodiments, the rotor assembly (or fan) may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet. In some embodiments, the rotor assembly may define a rotor diameter between 52 inches to 120 inches. In some embodiments, the rotor diameter can be between 75 inches and 105 inches, such as between 70 inches and 80 inches, 80 inches and 95 inches, or 96 inches and 105 inches.

In some embodiments, it will be appreciated that the engine includes a ratio of a quantity of outlet guide vanes to a quantity of blades that could be less than, equal to, or greater than 1:1. For example, in particular embodiments, the engine includes twelve (12) fan blades and ten (10) outlet guide vanes. In other embodiments, the vane assembly includes a greater quantity of outlet guide vanes to fan blades. For example, in particular embodiments, the engine includes ten (10) fan blades and twenty-three (23) outlet guide vanes. For example, in certain embodiments, the engine may include a ratio of a quantity of outlet guide vanes to a quantity of blades between 1:2 and 5:2. The ratio may be tuned based on a variety of factors including a size of the outlet guide vanes to ensure a desired amount of swirl is removed for an airflow from the primary fan.

In some embodiments, a ratio of the number of OGVs to the number of fan blades can be between 2.0 and 2.5, or between 2.2 and 2.6. In other examples, the ratio of the number of OGVs to the number of fan blades can be between 1.5 and 3.0 or between 1.8 and 2.4.

Additionally, in certain exemplary embodiments, where the engine includes the third stream and a mid-fan (a ducted fan aft of the primary, forward fan), a ratio $R_1/R_2$ may be between 1 and 10, or 2 and 7, or at least 3.3, at least 3.5, at least 4 and less than or equal to 7, where $R_1$ is the radius of the primary fan and $R_2$ is the radius of the mid-fan.

It should be appreciated that various embodiments of the engine may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps. Alternatively, in certain suitable embodiments, the engine allows for normal aircraft operation of at least Mach 0.3.

A fan pressure ratio (FPR) for the primary fan of the fan assembly can be 1.04 to 2.20 as measured across the fan blades of the primary fan at a cruise flight condition. For example, the FPR can be in a range from 1.05 to 1.2, 1.25 to 1.45, 1.30 to 1.35, less than 1.40, and/or less than 1.08, In order for the gas turbine engine to operate with a fan having the above characteristics to define the above FPR, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed can be between 2.0 and 2.9, between 3.0 and 4.0, between 3.2 and 3.5, between 3.2 and 4.0, between 3.25 and 3.75, or between 3.5 and 4.5. In some embodiments, a gear ratio of the input rotational speed to the output rotational speed is greater than 4.1. For example, in particular embodiments, the gear ratio is within a range of 4.0 to 4.5, within a range of 4.1 to 14.0, within a range of 4.1 to 5.0, within a range of 4.1 to 6.0, within a range of 4.5 to 14.0, or within a range of 6.0 to 14.0. In certain embodiments, the gear ratio is within a range of 4.5 to 12 or within a range of 6.0 to 11.0.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 4 to 15 stages, a high-pressure turbine may include 1 to 2 stages, and/or a low pressure turbine (LPT) may include 1 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

A core engine is generally encased in an outer casing defining one half of a core diameter ($D_{core}$), which may be thought of as the maximum extent from a centerline axis (datum for R). In certain embodiments, the engine includes a length (L) from a longitudinally (or axial) forward end to a longitudinally aft end. In various embodiments, the engine defines a ratio of $L/D_{core}$ that provides for reduced installed drag. In one embodiment, $L/D_{core}$ is at least 2. In another embodiment, $L/D_{core}$ is at least 2.5. In some embodiments, the $L/D_{core}$ is less than 5, less than 4, and less than 3.

The reduced installed drag may further provide for improved efficiency, such as improved specific fuel consumption. Additionally, or alternatively, the reduced installed drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Additionally, it should be appreciated that ranges of power loading and/or rotor blade tip speed may correspond to certain structures, core sizes, thrust outputs, etc., or other structures of the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine comprising: a turbomachine comprising a compressor section, a combustion section, and a turbine section arranged in serial flow order, the turbomachine defining an engine inlet to an inlet duct, a fan duct inlet to a fan duct, and a core inlet to a core duct; a primary fan driven by the turbomachine; and a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct.

The gas turbine engine of any clause herein, wherein the thrust to power airflow ratio and the core bypass ratio are defined when the gas turbine engine is operated at a rated speed during standard day operating conditions.

The gas turbine engine of any clause herein, wherein the thrust to power airflow ratio between 4 and 75.

The gas turbine engine of any clause herein, wherein the primary fan is an unducted primary fan, and wherein the thrust to power airflow ratio between 30 and 60.

The gas turbine engine of any clause herein, wherein the thrust to power airflow ratio is between 35 and 50.

The gas turbine engine of any clause herein, wherein the core bypass ratio is between 0.3 and 5.

The gas turbine engine of any clause herein, wherein the gas turbine engine is a turboprop engine, and wherein the thrust to power airflow ratio is between 40 and 100.

The gas turbine engine of any clause herein, wherein the primary fan is a ducted primary fan, and wherein the thrust to power airflow ratio is between 3.5 and 40.

The gas turbine engine of any clause herein, wherein the gas turbine engine is a direct drive gas turbine engine, and wherein the thrust to power airflow ratio is between 3.5 and 20.

The gas turbine engine of any clause herein, wherein the gas turbine engine is a geared gas turbine engine, and wherein the thrust to power airflow ratio is between 8 and 40.

The gas turbine engine of any clause herein, wherein the secondary fan is a single stage secondary fan.

The gas turbine engine of any clause herein, wherein the secondary fan is a multi-stage secondary fan.

The gas turbine engine of any clause herein, wherein the multi-stage secondary fan is a two stage secondary fan.

The gas turbine engine of any clause herein, wherein the primary fan is a ducted primary fan comprising an outer nacelle surrounding the primary fan and defining the bypass passage downstream of the primary fan and over the turbomachine, wherein the gas turbine engine further defines a bypass passage outlet at a downstream end of the outer nacelle, wherein the fan duct defines a fan duct outlet, and wherein the fan duct outlet is downstream of the bypass passage outlet.

The gas turbine engine of any clause herein, wherein the primary fan is a ducted primary fan comprising an outer nacelle surrounding the primary fan and defining the bypass passage downstream of the primary fan and over the turbomachine, wherein the gas turbine engine further defines a bypass passage outlet at a downstream end of the outer nacelle, wherein the fan duct defines a fan duct outlet, and wherein the fan duct outlet is upstream of the bypass passage outlet.

The gas turbine engine of any clause herein, wherein the primary fan, the secondary fan, the compressor section, the combustion section, and the turbine section are arranged in serial flow order.

A method of operating a gas turbine engine, comprising: operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5, wherein the thrust to power airflow ratio is a ratio of an airflow through a bypass passage over a turbomachine of the gas turbine engine plus an airflow through a fan duct to an airflow through a core duct, and wherein the core bypass ratio is a ratio of the airflow through the fan duct to the airflow through the core duct.

The method of any clause herein, wherein The gas turbine engine of claim 1, wherein the thrust to power airflow ratio between 4 and 75.

The method of any clause herein, wherein the primary fan is an unducted primary fan, and wherein the thrust to power airflow ratio between 30 and 60.

The method of any clause herein, wherein the thrust to power airflow ratio between 35 and 50.

The method of any clause herein, wherein the core bypass ratio between 0.3 and 5.

A gas turbine engine comprising: a core turbine engine comprising a low pressure turbine; a gearbox assembly coupled to the low pressure turbine; a fan coupled to the gearbox assembly and having a fan diameter and a plurality of fan blades with a blade solidity that is greater than or equal to 0.8 and less than or equal to 2.0; a blade effective acoustic length (BEAL) defined as:

$$BEAL = \frac{2c^2}{S(1 - rr)N_b}\cos(\gamma)$$

wherein c is the chord length of a fan blade of the plurality of fan blades, S is a span of the fan blade, rr is a radius ratio of the fan, $\gamma$ is the stagger angle of the fan blade, and Nb is the number of the plurality of fan blades; a nacelle that includes a fan case that surrounds the fan, the fan case comprising an inlet disposed forward of the fan and an inlet length, wherein the inlet length is an axial distance between the leading edge of one of the plurality of fan blades and the inlet to the fan, as measured at a 75% span position of the fan blade; a plurality of outlet guide vanes disposed aft of the fan and extending radially between the core turbine engine and the fan case; an acoustic spacing from the fan blade trailing edge to an outlet guide vane leading edge; an acoustic spacing ratio (ASR) defined as:

$$ASR = \frac{1}{\left(\frac{Nv}{Nb}\right)} \cdot \frac{As}{BEAL}$$

wherein As is the acoustic spacing and Nv is the number of the plurality of outlet guide vanes, and an inlet-to-nacelle (ITN) ratio is defined as a ratio of the inlet length to a maximum diameter of the nacelle, wherein the ASR of the gas turbine engine is 1.5 to 16.0 and the ITN ratio is 0.23 to 0.35.

The gas turbine engine of the preceding clause, also including a disk-to-blade diametric (DBD) ratio defined as a ratio of a disk spacing length to the fan diameter, the disk spacing length being a distance between a forwardmost end of a fan disk and an intersection with the inlet taken along an engine centerline, wherein the DBD ratio of the gas turbine engine is 0.09 to 0.59, 0.15 to 0.35, or 0.19 to 0.27.

The gas turbine engine of any clause herein, also including a disk-to-nacelle diametric (DND) ratio defined as a ratio of a disk spacing length to the fan diameter, the disk spacing length being a distance between a forwardmost end of a fan disk and an intersection with the inlet taken along an engine centerline, wherein the DND ratio of the gas turbine engine is 0.07 to 0.47, 0.15 to 0.35, or 0.15 to 0.25.

The gas turbine engine of any clause herein, also including a disk-to-inlet length (DIL) ratio defined as a ratio of a disk spacing length to the fan diameter, the disk spacing length being a distance between a forwardmost end of a fan disk and an intersection with the inlet taken along an engine centerline, wherein the DIL ratio of the gas turbine engine is 0.30 to 0.80, 0.3 to 0.70, or 0.49 to 0.65.

The gas turbine engine of any clause herein, further comprising a fan pressure ratio from 1.25 to 1.45.

The gas turbine engine of any clause herein, further comprising an inlet length ratio that is a ratio of an inlet length to a diameter of the fan blade, wherein the inlet length defines an average distance from a leading edge of the fan blade to an inlet of the fan, and wherein the inlet length ratio is 0.15 to 0.4, or 0.15 to 0.3.

The gas turbine engine of any clause herein, wherein the fan case further comprises an acoustic treatment disposed on an interior surface of the fan case, and, optionally, the acoustic treatment length is 50% to 90% of an inlet length.

The gas turbine engine of any clause herein, wherein the number of the plurality of outlet guide vanes is at least twice the number of the plurality of fan blades.

The gas turbine engine of any clause herein, wherein the low pressure turbine comprises at least three low pressure turbine stages or at least four low pressure turbine stages.

The gas turbine engine of any clause herein, wherein plurality of outlet guide vanes further comprise serrated leading edges.

The gas turbine engine of any clause herein, wherein the plurality of fan blades comprise composite materials that include a matrix and a plurality of fiber plies.

The gas turbine engine of any clause herein, wherein the plurality of fiber plies are interwoven in in-plane and out-of-plane orientations, and/or the plurality of fiber plies are interwoven in three or more different orientation angles.

The gas turbine engine of any clause herein, wherein a fan blade diameter of the fan blade is 65-80 inches, 80-95 inches, or 95-115 inches.

The gas turbine engine of any clause herein, wherein the number of the plurality of fan blades is 14-26, 20-24, or 20-22.

The gas turbine engine of any clause herein, wherein the blade solidity is 0.8 to 1.5, 1.0 to 2.0, or 1.25 to 1.75.

The gas turbine engine of any clause herein, wherein the gas turbine engine has a bypass ratio of 10:1 to 17:1 or 12:1 to 15:1.

A gas turbine engine can include a turbomachine with a compressor section, a combustion section, and a turbine section arranged in serial flow order, the turbomachine defining an engine inlet to an inlet duct, a fan duct inlet to a fan duct, and a core inlet to a core duct; a primary fan driven by the turbomachine and including a plurality of primary fan blades; an outer nacelle surrounding the primary fan; a secondary fan located downstream of the primary fan within the inlet duct; a plurality of outlet guide vanes disposed aft of the primary fan; and a blade effective acoustic length (BEAL) defined as:

$$BEAL = \frac{2c^2}{S(1-rr)N_b}\cos(\gamma)$$

wherein c is a chord length of a primary fan blade of the plurality of primary fan blades, S is a span of the primary fan blade, rr is a radius ratio of the primary fan, $\gamma$ is a stagger angle of the primary fan blade, and Nb is a number of the plurality of primary fan blades; an inlet-to-nacelle (ITN) ratio between 0.23 and 0.35, wherein the ITN ratio is a ratio of an inlet length to a maximum diameter of the outer nacelle, and an acoustic spacing ratio (ASR) which can be between 1.5 and 16.0, wherein the acoustic spacing ratio is defined as:

$$ASR = \frac{1}{\left(\frac{Nv}{Nb}\right)} \cdot \frac{As}{BEAL}$$

wherein As is the acoustic spacing and Nv is a number of the plurality of outlet guide vanes, wherein the gas turbine engine can define a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct.

The gas turbine engine of any clause herein, wherein the thrust to power airflow ratio and the core bypass ratio can be defined when the gas turbine engine is operated at a rated speed during standard day operating conditions.

The gas turbine engine of any clause herein, wherein the thrust to power airflow ratio can be between 4 and 75.

The gas turbine engine of any clause herein, wherein the thrust to power airflow ratio can be between 20 and 35.

The gas turbine engine of any clause herein, wherein the thrust to power airflow ratio can be between 3.5 and 40.

The gas turbine engine of any clause herein, wherein the thrust to power airflow ratio can be between 8 and 40.

The gas turbine engine any clause herein, wherein the gas turbine engine can include an inlet length ratio, wherein: the inlet length ratio is a ratio of an inlet length to a diameter of the primary fan blade of the plurality of primary fan blades, wherein the inlet length is an average distance from a leading edge of the fan blade to an inlet of the outer nacelle, and wherein the inlet length ratio can be between 0.15 and 0.4.

The gas turbine engine of any clause herein, wherein the outer nacelle can include an acoustic treatment.

The gas turbine engine of any clause herein, wherein the acoustic treatment can be disposed on an interior surface of the outer nacelle between the primary fan and the plurality of outlet guide vanes.

The gas turbine engine of any clause herein, wherein the radius ratio can be between 0.2 and 0.35.

The gas turbine engine of any clause herein, wherein the radius ratio can be between 0.25 and 0.35.

The gas turbine engine of any clause herein, wherein the number of the plurality of primary fan blades (Nb) can be between 14 and 26.

The gas turbine engine of any preceding clause, also including a disk-to-nacelle diametric (DND) ratio defined as a ratio of a disk spacing length to the fan diameter, the disk spacing length being a distance between a forwardmost end of a fan disk and an intersection with the inlet taken along an engine centerline, wherein the DND ratio of the gas turbine engine is 0.07 to 0.47, 0.15 to 0.35, or 0.15 to 0.25.

The gas turbine engine of any clause herein, also including a disk-to-inlet length (DIL) ratio defined as a ratio of a disk spacing length to the fan diameter, the disk spacing length being a distance between a forwardmost end of a fan disk and an intersection with the inlet taken along an engine centerline, wherein the DIL ratio of the gas turbine engine is 0.30 to 0.80, 0.3 to 0.70, or 0.49 to 0.65.

The gas turbine engine of any clause herein, wherein the primary fan can have a diameter between 80 inches and 95 inches.

The gas turbine engine of any clause herein, also including a disk-to-blade diametric (DBD) ratio defined as a ratio of a disk spacing length to the fan diameter, the disk spacing length being a distance between a forwardmost end of a fan disk and an intersection with the inlet taken along an engine centerline, wherein the DBD ratio of the gas turbine engine is 0.09 to 0.59, 0.15 to 0.35, or 0.19 to 0.27.

The gas turbine engine of any clause herein, which can further include a gearbox assembly coupling the turbine section to the primary fan.

The gas turbine engine of any clause herein, wherein the gas turbine engine can further define a bypass passage outlet at a downstream end of the outer nacelle, wherein the fan duct can define a fan duct outlet, and wherein the fan duct outlet can be downstream of the bypass passage outlet.

The gas turbine engine of any clause herein, wherein the gas turbine engine can further define a bypass passage outlet at a downstream end of the outer nacelle, wherein the fan duct can define a fan duct outlet, and wherein the fan duct outlet can be upstream of the bypass passage outlet.

The gas turbine engine of any clause herein, wherein the plurality of primary fan blades can be formed from a composite material.

In view of the many possible examples to which the principles of the disclosure may be applied, it should be recognized that the illustrated examples are only preferred examples and should not be taken as limiting the scope. Rather, the scope is defined by the following claims. We therefore claim all that comes within the scope and spirit of these claims.

We claim:

1. A gas turbine engine comprising:
a turbomachine comprising a compressor section, a combustion section, and a turbine section arranged in serial flow order, the turbomachine defining an engine inlet to an inlet duct, a fan duct inlet to a fan duct, and a core inlet to a core duct;
a primary fan driven by the turbomachine and comprising a plurality of primary fan blades;
an outer nacelle surrounding the primary fan;
a secondary fan located downstream of the primary fan within the inlet duct; and
a plurality of outlet guide vanes disposed aft of the primary fan;
a blade effective acoustic length (BEAL) defined as:

$$BEAL = \frac{2c^2}{S(1 - rr)N_b} \cos(\gamma)$$

wherein c is a chord length of a primary fan blade of the plurality of primary fan blades, S is a span of the primary fan blade, rr is a radius ratio of the primary fan, $\gamma$ is a stagger angle of the primary fan blade, and Nb is a number of the plurality of primary fan blades;
an inlet-to-nacelle (ITN) ratio between 0.23 and 0.35; and
an acoustic spacing ratio (ASR) between 1.5 and 16.0, wherein the acoustic spacing ratio is defined as:

$$ASR = \frac{1}{\left(\frac{Nv}{Nb}\right)} \cdot \frac{As}{BEAL}$$

wherein As is the acoustic spacing and Nv is a number of the plurality of outlet guide vanes, wherein the gas turbine engine defines a thrust to power airflow ratio between 3.5 and 100 and a core bypass ratio between 0.1 and 10,
wherein the thrust to power airflow ratio is a ratio of an airflow through a bypass passage over the turbomachine plus an airflow through the fan duct to an airflow through the core duct,
wherein the core bypass ratio is a ratio of the airflow through the fan duct to the airflow through the core duct, and
wherein the ITN ratio is a ratio of an inlet length to a maximum diameter of the outer nacelle.

2. The gas turbine engine of claim 1, wherein the thrust to power airflow ratio and the core bypass ratio are defined when the gas turbine engine is operated at a rated speed during standard day operating conditions.

3. The gas turbine engine of claim 1, wherein the thrust to power airflow ratio is between 4 and 75.

4. The gas turbine engine of claim 1, wherein the thrust to power airflow ratio is between 20 and 35.

5. The gas turbine engine of claim 4, further comprising an inlet length ratio, wherein:
the inlet length ratio is a ratio of an inlet length to a diameter of the primary fan blade of the plurality of primary fan blades,
wherein the inlet length is an average distance from a leading edge of the fan blade to an inlet of the outer nacelle, and
wherein the inlet length ratio is between 0.15 and 0.4.

6. The gas turbine engine of claim 4, wherein the outer nacelle comprises an acoustic treatment.

7. The gas turbine engine of claim 6, wherein the acoustic treatment is disposed on an interior surface of the outer nacelle between the primary fan and the plurality of outlet guide vanes.

8. The gas turbine engine of claim 1, wherein the thrust to power airflow ratio is between 3.5 and 40.

9. The gas turbine engine of claim 1, wherein the thrust to power airflow ratio is between 8 and 40.

10. The gas turbine engine of claim 1, wherein the radius ratio is between 0.2 and 0.35.

11. The gas turbine engine of claim 10, wherein the radius ratio is between 0.25 and 0.35.

12. The gas turbine engine of claim 1, wherein the number of the plurality of primary fan blades ($N_b$) is between 14 and 26.

13. The gas turbine engine of claim 1, further comprising a disk-to-nacelle diametric (DND) ratio defined as a ratio of a disk spacing length to the fan diameter, the disk spacing length being a distance between a forwardmost end of a fan disk and an intersection with the inlet taken along an engine centerline, wherein the DND ratio of the gas turbine engine is 0.07 to 0.47.

14. The gas turbine engine of claim 1, further comprising a disk-to-inlet length (DIL) ratio defined as a ratio of a disk spacing length to the fan diameter, the disk spacing length being a distance between a forwardmost end of a fan disk and an intersection with the inlet taken along an engine centerline, wherein the DIL ratio of the gas turbine engine is 0.30 to 0.80.

15. The gas turbine engine of claim 1, wherein the primary fan has a diameter between 80 inches and 95 inches.

16. The gas turbine engine of claim 1, further comprising a disk-to-blade diametric (DBD) ratio defined as a ratio of a disk spacing length to the fan diameter, the disk spacing length being a distance between a forwardmost end of a fan disk and an intersection with the inlet taken along an engine centerline, and wherein the DBD ratio of the gas turbine engine is 0.09 to 0.59.

17. The gas turbine engine of claim 1, further comprising a gearbox assembly coupling the turbine section to the primary fan.

18. The gas turbine engine of claim 1, wherein the gas turbine engine further defines a bypass passage outlet at a downstream end of the outer nacelle, wherein the fan duct defines a fan duct outlet, and wherein the fan duct outlet is downstream of the bypass passage outlet.

19. The gas turbine engine of claim 1, wherein the gas turbine engine further defines a bypass passage outlet at a downstream end of the outer nacelle, wherein the fan duct defines a fan duct outlet, and wherein the fan duct outlet is upstream of the bypass passage outlet.

20. The gas turbine engine of claim 1, wherein the plurality of primary fan blades are formed from a composite material.

\* \* \* \* \*